United States Patent
Tollefsbol et al.

(10) Patent No.: US 12,502,020 B2
(45) Date of Patent: Dec. 23, 2025

(54) APPARATUS FOR INFUSING A LIQUID

(71) Applicant: GSI Outdoors, Inc., Spokane, WA (US)

(72) Inventors: Trevor Tollefsbol, Couer D'Alene, ID (US); Ian Scott, Spokane Valley, WA (US); Kurt Gauss, Spokane, WA (US)

(73) Assignee: GSI Outdoors, Inc., Spokane, WA (US)

( * ) Notice: Subject to any disclaimer, the term of this patent is extended or adjusted under 35 U.S.C. 154(b) by 953 days.

(21) Appl. No.: 17/696,533

(22) Filed: Mar. 16, 2022

(65) Prior Publication Data

US 2023/0309737 A1 Oct. 5, 2023

(51) Int. Cl.
| A47J 31/38 | (2006.01) |
| A47J 31/00 | (2006.01) |
| A47J 31/06 | (2006.01) |
| A47J 31/36 | (2006.01) |
| A47J 31/44 | (2006.01) |
| A47J 31/46 | (2006.01) |

(52) U.S. Cl.
CPC ............ *A47J 31/38* (2013.01); *A47J 31/005* (2013.01); *A47J 31/0663* (2013.01); *A47J 31/0684* (2013.01); *A47J 31/3671* (2013.01); *A47J 31/446* (2013.01); *A47J 31/461* (2018.08)

(58) Field of Classification Search
CPC ........ A47J 36/10; A47J 45/10; A47J 31/4482; A47J 31/061; A47J 31/469; A47J 31/60; A47J 31/4485; A47J 31/02
USPC .......................................................... 99/287
See application file for complete search history.

(56) References Cited

U.S. PATENT DOCUMENTS

| 6,742,442 B1 | 6/2004 | Su | |
| 11,497,343 B2 | 11/2022 | Kuempel | |
| 2010/0098823 A1 | 4/2010 | Nenov | |
| 2010/0218686 A1* | 9/2010 | O'Brien | A47J 31/40 99/289 |

(Continued)

FOREIGN PATENT DOCUMENTS

| AU | 2010101197 A4 | 11/2010 |
| CN | 205018849 U | 2/2016 |
| EP | 2222210 B1 | 7/2019 |

(Continued)

OTHER PUBLICATIONS

Aram Espresso Maker webpage on aram.coffee website.

(Continued)

*Primary Examiner* — Chris Q Liu
*Assistant Examiner* — Solan Oliva
(74) *Attorney, Agent, or Firm* — Randall Danskin P.S.

(57) ABSTRACT

An apparatus for infusing a liquid that may be espresso, generally provides a body having a gear box at one end portion of the body, a lead screw and a hand crank mechanically communicating with the gearbox, and a valve body and plunger carried at an end portion of the lead screw opposite the gearbox for axial, and non-rotational, movement within a medial chamber defined by an insulated pressure cylinder, the pressure cylinder releasably engaged with a removable a portafilter frame, opposite the gearbox, that carries a removable particulate basket therein, and a carafe releasably engaged with the porta filter frame opposite the pressure cylinder, and a tamper for compressing particulate in the particulate basket.

24 Claims, 13 Drawing Sheets

(56) References Cited

U.S. PATENT DOCUMENTS

2011/0185912 A1* 8/2011 Chen ................ A47J 31/00
99/302

FOREIGN PATENT DOCUMENTS

| ES | 2313185 T3 | 3/2009 |
|----|------------|--------|
| WO | 2003101264 A1 | 12/2003 |
| WO | 2018098544 A1 | 6/2018 |

OTHER PUBLICATIONS https://meticuloushome.com.
https://www.kickstarter.com/projects/meticulous/meticulous-espresso/description.
Printout of the Kickstarter website for Meticulous Espresso.

* cited by examiner

APPARATUS FOR INFUSING A LIQUID

TECHNICAL FIELD

The present invention relates to a manually operated liquid infusing apparatus, including an espresso maker, that utilizes manually generated pressure to extract different textures, aromas and flavors from a desired particulate.

BACKGROUND OF THE INVENTION

Coffee is a widely consumed beverage. It is normally consumed hot and is made by extracting soluble components from particulated coffee beans that have been processed through a coffee grinder after roasting by using hot water. It is well-known that the texture, aroma and flavor of coffee varies substantially, even with identical ground coffee as the starting material, depending upon the precise conditions under which the extraction is carried out (pressure/time). One known widely used method to extract the soluble components is to pass a small quantity of heated water through a quantity of compressed particulated coffee under relatively high pressure. This results in a quantity of so-called "espresso" coffee which is one type of coffee beverage preferred by many consumers.

Espresso coffee is a method of brewing coffee by passing hot (not boiling) water under high pressure through the ground coffee. The typical espresso coffee machine generally operates at a pressure of approximately 9-10 bar.

Various textures, aromas and flavors can be extracted from coffee, and the extraction of such various textures, aromas and flavors is materially influenced by the pressure exerted upon the heated fluid being forced through the particulated coffee, and the duration of time during which the particulated coffee is exposed to the heated fluid. Traditional espresso making machines generally operate under a pressure between approximately nine and 10 bar. (Typically about 130 psi or higher, and the duration is typically about 20-30 seconds.

In order to produce espresso, it is common to use an electrically powered, and countertop size espresso machine. These machines are generally provided with a plumbed-in water supply and include means for maintaining a reservoir of water at a relatively high temperature as well as a complex plumbing/metering system for expelling a measured quantity of hot water through the compressed particulated coffee.

Apparatus of this type is typically of substantial size and weight and usually requires plumbing to a water supply as well as interconnection to an electrical supply.

Unfortunately, coffee consumers have not had access to an easily transportable, compact in size, and manually operated espresso maker that allows them to enjoy their preferred texture, aroma, flavor and preference of coffee type when engaging in outdoor activities, such as camping, or otherwise distant from sources of automated power The present invention resolves various of the remaining needs and desires of coffee consumers.

SUMMARY OF THE INVENTION

An apparatus for infusing a liquid that may include, but is not limited to espresso, generally provides a body, a gear box, a lead screw, a hand crank, a valve body, a plunger, a pressure cylinder, a portafilter frame carrying a removable particulate basket, a carafe and a tamper.

A principal aspect of the present invention is to provide an apparatus for infusing a liquid, the apparatus comprising: a body 10 having a first end portion 11, and a second end portion 12 and an outer circumferential surface 14; a gear box 20 at the first end portion 11 of the body 10, the gear box 20 having a first end portion 21 that defines a liquid receiving depression 27, a second end portion 22, and a liquid channel 32 that communicates between the liquid receiving depression 27 and the second end portion 22 for liquid to pass there-through, the gear box 20 further defining an axially aligned lead screw channel 38 that carries an axially movable lead screw 60 therein; and the axially movable lead screw 60 has opposing first 61 and second 62 end portions, defines threads 65 in an outer circumferential surface 64, and defines an axially aligned key-way 66 that engages with a lead screw lug 39 carried by the gear box 20 to prevent the lead screw 60 from rotating axially relative to the gear box 20, and the axially movable lead screw 60 threadably communicates with a lead screw nut 105 that is carried in a lead screw nut cavity 51 defined in the gear box 20; and the lead screw nut 105 defines worm gear threads 109 in an outer circumferential surface 108, and defines an axial channel 110, and threads 113 defined in an inner circumferential surface of the lead screw nut 105 axial channel 110 operatively engage with the threads 65 defined in the axially movable lead screw 60; and the lead screw nut cavity 51 defined in the gear box 20 communicates with a transversely extending worm gear channel 37 defined in the gear box 20, so that the worm gear threads 109 defined in the lead screw nut 105 operatively engage with worm gear threads 56 defined in a worm gear 45 carried in the worm gear channel 37; and a hand crank 140 is interconnected with the worm gear 45 so that rotation of the hand crank 140 is mechanically communicated to the lead screw 60 to axially move the lead screw 60, relative to the gear box 20 and without axial rotation, in a first direction, and in a second direction; and a valve body 85 is carried at the second end portion 62 of the lead screw 60, the valve body 85 defining a pressure relief channel 91, and carrying a spider ring spring 120 that positionally biases a portion of the valve body 85 relative to a plunger 70; and the plunger 70 is generally annular in configuration and defines a medial axial channel 82, and the spider ring spring 120 may bias the plunger 70 in a direction away from engagement with the valve body 85 so that a gap 101 is defined between the valve body 85 and the plunger 70 so that liquid may flow therebetween from a position in the body 10 above the plunger 70 to a position in a pressure cylinder 160 below the plunger 70 when the plunger 70 is in a first position; and the pressure cylinder 160 is elongate, and cylindrical, and has a first end portion 161 that is threadably interconnected with the second end portion 22 of the gear box 20, and the pressure cylinder 160 defines a medial channel 164 that extends between the first end portion 161 and a second end portion 162. the medial channel 164 having an inner diameter 168 that is substantially the same as a diameter 81 of the plunger 70 so that a fluid tight seal is maintained therebetween as the plunger 70 moves axially within the pressure cylinder 160 medial channel 164 responsive to rotation of the hand crank 140 and axial movement of the lead screw 60, the pressure cylinder 160 further defining threads at a second end portion to provide a releasable interconnection with a portafilter frame 180; and the portafilter frame 180 is threadably interconnected to the second end portion 162 of the pressure cylinder 160, the portafilter frame 180 defining a medial channel 185 and carrying a removable particulate basket 200 within the medial channel 185, the removable particulate basket defining a particulate cavity 205 and a plurality of spacedly arrayed holes 204 are defined within the particulate cavity 205 for passage of infused liquid there-through, and into a carafe 220; and the carafe 220 is threadably interconnected to the portafilter frame 180 opposite the pressure cylinder 160 and the carafe 220 defines a fluid receiving cavity 225 to collect the infused liquid passing through the removable particulate basket 200.

A further aspect of the present invention is to provide an apparatus for infusing a liquid wherein the pressure cylinder has an inner wall 175 and an outer wall 176 with a thermally insulating void between the inner wall 175 and the outer wall 176.

A further aspect of the present invention is to provide an apparatus for infusing a liquid wherein the spider ring spring 120 has a spider ring hub 121 that defines a medial channel 122 through which the second end portion 62 of the lead screw 60 extends; a valve body engaging edge portion 123 adjacent the spider ring hub 121; and plural spacedly arrayed spider ring arms 124 that each extend generally radially outwardly from the spider ring hub 121, each of the plural spacedly arrayed spider ring arms 124 having a first outer arm portion 126, and a second inner arm portion 127, and each first outer arm portion 126 terminates at a terminal end portion 125 that communicates with the plunger 70; and the spider ring spring 120 movably interconnects the valve body 85 and the plunger 70.

A further aspect of the present invention is to provide an apparatus for infusing a liquid wherein the worm gear 45 is barrel-like in configuration and has a first end portion 46, a second end portion 47, and a socket pinion 50 extends axially from the second end portion 47; and the worm gear 45 is carried on rotation bushings within the transversely extending worm gear channel 37 defined in the gear box 20.

A further aspect of the present invention is to provide an apparatus for infusing a liquid wherein the plunger 70 defines a diameter 81 and has an outer circumferential edge 73, that defines an O-ring channel 74, that carries an O-ring 75 therein; and an inwardly downwardly tapering depression 76 defined in an upper surface of the plunger 70 defines an annular fluid seal groove 77 which carries a seal 78 therein to provide a fluid tight seal between the plunger 70 and a plunger engaging flange 89 of the valve body 85; and the plunger 70 defines plural spacedly arrayed spider arm latches 80 in the outer circumferential edge 73, and each of the spacedly arrayed spider arm latches 80 is configured to engage with a terminal end portion 125 of one of the plural spacedly arrayed spider arms 124 of the spider ring spring 120.

A further aspect of the present invention is to provide an apparatus for infusing a liquid and further comprising: a flexible vented gasket 192 between the carafe 220 and the portafilter frame 180 to allow escape/release of pressurized vapor therethrough.

A further aspect of the present invention is to provide an apparatus for infusing a liquid wherein the carafe 220 is cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 defines threads 229 that engage with threads 191 defined in the second end portion 182 of the portafilter frame 180, the carafe 220 further having gripping features 230 to promote gripping by a user for detachment from, and attachment to, the portafilter frame 180, and attachment to, and detachment from, a tamper 250.

A further aspect of the present invention is to provide an apparatus for infusing a liquid wherein the gear box 20 has an outer circumferential surface 23, a first end portion 21 that has an upper surface 21A that defines a recessed liquid receiving depression 27; and a second end portion 22 that has a lower surface 22A; and a radially reduced medial portion 26 between the first end portion 21 and the second end portion 22; and a liquid drain 28 is defined within the liquid receiving depression 27, the liquid drain 28 defining the liquid channel 32 that communicates between the recessed liquid receiving depression 27 and the lower surface 22A for liquid to pass there-through; and the gear box 20 further defining the axially aligned lead screw channel 38 that extends between the upper and lower surfaces 21A, 22A, and the lead screw channel 38 carries a radially inwardly extending lead screw key 39 that slidably engages with the keyway 66 defined in the axially movable lead screw 60 carried within the lead screw channel 38.

A further aspect of the present invention is to provide an apparatus for infusing a liquid wherein the lead screw 60, and the lead screw nut 105, and the worm gear 45 all rotate relative to one another responsive to rotation of the hand crank 140; and the lead screw nut cavity 51 defined in the gear box 20 communicates with a transversely extending worm gear channel 37 defined in the gear box 20, so that the worm gear threads 109 defined in the lead screw nut 105 operatively engage with the worm gear threads 56 defined in a worm gear 45 carried in the transversely extending worm gear channel 37.

A further aspect of the present invention is to provide an apparatus for infusing a liquid and wherein the hand crank 140 is positionally adjustable and extends proximate the outer circumferential surface 14 of the body 10; and the hand crank 140 has a socket 141 that has a first end portion 142 and a second end portion 143, and the first end portion 142 of the socket 141 is engaged with an axially extending socket pinion 50 carried by the worm gear 45; and the second end portion 143 of the socket 141 defines a diametrically extending through hole 144 to adjustably positionally engage with an elongate second arm 146 of the hand crank 140; and the socket 141 also defines an axially aligned hole 145 in the second end portion 143 for a threaded set screw 153 to adjustably secure the elongate second arm 146 to the socket 141; and the elongate second arm 146 has a first end portion 147 and a second end portion 148 that defines plural spacedly arrayed bends 149, and the first end portion 147 of the elongate second arm 146 defines a first 151 and a second 152 diametrically extending through hole for the threaded set screw 153, and the first hole 151 is aligned axially perpendicular relative to the second hole 152; and the second end portion 148 of the elongate second arm 146 carries a hand grip 150 at a terminal end thereof; and the elongate second arm 146 is positionally adjustable relative to the socket 141 by predetermined alignment of the first and second through holes 151, 152 relative to the axially aligned hole 145 defined in the socket 141 and engagement of the threaded set screw 153 therein; and rotation of the hand crank 140 responsively axially rotates the worm gear 45, and the axial rotational motion of the worm gear 45 is threadably communicated to the lead screw nut 105 which responsively communicates the rotational motion to the lead screw 60, which responsively causes the lead screw 60 to move axially, and without rotation, in a first direction, and in a second direction; and the rotation of the hand crank 140 and the axial rotation of the worm gear 45 is in a direction that is perpendicular to the axial movement of the lead screw 60.

A further aspect of the present invention is to provide an apparatus for infusing a liquid wherein the valve body 85 is carried at the second end portion 62 of the lead screw 60, and the valve body 85 has an outwardly downwardly tapered first end portion 86, a medial portion 88, an inwardly downwardly tapered second end portion 87; and a plunger engaging flange 89, at the inwardly downwardly tapered second end portion 87; and a pressure relief channel 91 defined in the valve body 85 communicates between the inwardly downwardly tapered second end portion 87 which defines a pressure relief entrance orifice 93 and the medial portion 88 of the valve body 85 which defines a pressure relief exit orifice 92; and the pressure relief channel 91 defines an interior surface 95 at the pressure relief entrance 93; and a ball bearing seal 96 is carried within the pressure relief channel 91, the ball bearing seal 96 having a diameter 97 that frictionally communicates with interior surfaces 95 of the pressure relief entrance orifice 93 to provide a fluid tight seal therebetween; and the ball bearing seal 96 is positionally maintained in direct frictional contact with the interior surface 95 by a biasing spring 98 that has a predetermined compression strength of between approximately 10 bar (approximately 145 psi) and approximately 11 bar (approximately 160 psi).

A further aspect of the present invention is to provide an apparatus for infusing a liquid and wherein the plunger 70 is generally annular in configuration and has a first surface 71 proximate the valve body 85 that defines and inwardly downwardly tapered depression 76, and a second surface 72 opposite the valve body 85, and defines a medial axial channel 82 that operatively communicates with the valve body 85, and the plunger 70 has a diameter 81 with an outer circumferential edge 73, the outer circumferential edge 73 defining an O-ring channel 74, that carries an O-ring 75 therein; and the inwardly downwardly tapering depression 76 defines an annular fluid seal groove 77 which carries a seal 78 therein to provide a fluid tight seal between the plunger 70 and the valve body 85, and the plunger 70 defines plural spacedly arrayed spider arm latches 80 proximate the outer circumferential edge 73, each of the spacedly arrayed spider arm latches 80 configured to engage a terminal end portion 125 of one of plural spacedly arrayed spider arms 124 of the spider ring spring 120, and wherein an angle 131 between the first outer arm 126 and the second inner arm 127 of the spider ring spring 120 biases the plunger 70 in a direction away from engagement with the valve body 85 so that a gap 101 is defined between the valve body 85 and the inwardly tapered depression 76 defined in the first upper surface 71 of the plunger 70 so that liquid may flow therebetween from a position in the body 10 above the plunger 70 to a position in a pressure cylinder 160 below the plunger 70.

A further aspect of the present invention is to provide an apparatus for infusing a liquid wherein the pressure cylinder 160 is preferably formed of stainless steel, is elongate and cylindrical and has an inner wall 175 and an outer wall 176 with a thermally insulating void 177 therebetween; and the outer wall 176 has an outer circumferential surface 165; and the inner wall 175 has an inner circumferential surface 167; and the pressure cylinder 160 is threaded at a first end portion 161 and is threaded at a second end portion 162; and the pressure cylinder 160 first end portion 161 is threadably interconnected with the second end portion 22 of the gear box 20; and the pressure cylinder 160 defines a medial channel 164 that is defined by the inner circumferential surface 167 of the inner wall 175 and the medial channel 164 extends between the first end portion 161 and the second end portion 162; and the medial channel 164 has an inner diameter 168 that is substantially the same as the plunger diameter 81 so that a fluid tight seal is maintained between the inner circumferential surface 167 and the O-ring 75 carried in the O-ring channel 74 defined in the outer circumferential edge 73 of the plunger 70, as the plunger 70 moves axially within the medial channel 164 of the pressure cylinder 160 responsive to rotation of the hand crank 140 and axial movement of the lead screw 60, the pressure cylinder 160 medial channel 164 further having an inner radially enlarged shoulder 171 at the second end portion 162, the radially enlarged portion 171 defining threads 172 on an inner circumferential surface thereof, and the radially enlarged shoulder 171 defining a seal groove 173 carrying a seal 174 therein to provide a fluid tight threaded interconnection between the pressure cylinder 160 and the portafilter frame 180.

A further aspect of the present invention is to provide an apparatus for infusing a liquid wherein the portafilter frame 180 is releasably threadably interconnected to the second end portion 162 of the pressure cylinder 160, and optionally releasably threadably interconnected with a particulate tamper 250, the portafilter frame 180 having a first end portion 181, a medial portion 183, and a second end portion 182 and defines a medial channel 185 that has a diameter 186, and an inner circumferential surface 187, the portafilter frame 180 further has a radially reduced exterior shoulder 188 at the first end portion 181 with threads 189 defined in the radially reduced shoulder 188; and the portafilter frame 180 has a radially reduced exterior shoulder 190 at the second end portion 182 that defines threads 191; and the portafilter frame 180 carries a removable particulate basket 200 within the medial channel 185, the removable particulate basket having an upper end portion 201 with a radially enlarged securement lip 202 that carries a fluid seal (not shown) thereon; and the removable particulate basket 200 defines a medial particulate cavity 205 and a plurality of spacedly arrayed holes 204 are defined within the removable particulate basket 200 for passage of infused liquid there-through and into a carafe 220.

A further aspect of the present invention is to provide an apparatus for infusing a liquid wherein the carafe 220 is releasably interconnected to the radially reduced exterior shoulder 190 at the second end portion 182 of the portafilter frame 180 and the carafe 220 collects the infused fluid (not shown) passing through the removable particulate basket 200; and a flexible vented gasket 192 is carried between the carafe 220 and the portafilter frame 180 to allow escape of pressurized vapor; and the fluid carafe 220 is cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 releasably engages with the portafilter frame 180, the carafe 220 further having gripping features 230 in the exterior circumferential surface 224 to promote gripping by a user for detachment from, and attachment to, the portafilter frame 180.

A further aspect of the present invention is to provide an apparatus for infusing a liquid wherein the gearbox 20 provides a gear ratio between rotation of the hand crank 140 and axial movement of the lead screw 60 of approximately 1 rotation to 1.6 mm of travel.

A further aspect of the present invention is to provide an apparatus for infusing a liquid wherein the gearbox 20 provides a gear ratio between rotation of the hand crank 140 and axial movement of the lead screw 60 so as to generate pressure within the pressure cylinder 160 and below the plunger 70 of approximately 130 psi.

A further aspect of the present invention is to provide an apparatus for making espresso, the apparatus comprising: a body 10 having a first end portion 11, a medial portion 13, and a second end portion 12, the body 10 having a diameter 15 and an outer circumferential surface 14 that defines gripping features; a gear box 20 at the first end portion 11 of the body 10, the gear box 20 having an outer circumferential surface 23, a first end portion 21 that has an axially aligned upper surface 21A that defines a concavely shaped liquid receiving depression 27, and a second end portion 22 that has an axially aligned lower surface 22A, and a radially reduced medial portion 26 between the first end portion 21 and the second end portion 22, and a liquid drain 28 is defined within the concavely shaped liquid receiving depression 27, the liquid drain 28 defining a liquid channel 32 that communicates between the concavely shaped liquid receiving depression 27 and the axially aligned lower surface 22A for liquid to pass there-through, the gear box 20 further defining an axially aligned lead screw channel 38 that extends between the upper and lower axially aligned surfaces 21A, 22A, the lead screw channel 38 having a radially inwardly extending lead screw key 39 that slidably engages with a keyway 66 defined in an axially movable lead screw 60 that is carried within the lead screw channel 38; and the lead screw 60 is elongate and has a first end portion 61 and a second end portion 62, defines threads 65 in an outer circumferential surface 64, and defines an axially aligned anti-rotation key-way 66 that extends between the first end portion 61 and the second end portion 62, the key-way 66 slidably engages with the lead screw lug 39 to prevent the lead screw 60 from rotating axially, and the lead screw 60 is carried within and extends axially though the lead screw channel 38 and extends axially outwardly from both the first end portion 21 and the second end portion 22 of the gear box 20, and the lead screw 60 threadably communicates with a lead screw nut 105 that is rotatably carried on rotation bushings 52 in a lead screw nut cavity 51 defined in the gear box 20, and the lead screw nut 105 defines a medial axial channel 110 through which the lead screw 60 axially extends, and threads 113 defined in an inner circumferential surface of a medial axial channel 110 operatively engage with the threads 65 defined in the outer circumferential surface 64 of the lead screw 60 so that the lead screw 60 and the lead screw nut 105 move relative to one another responsive to axial rotation of the lead screw nut 105, and the lead screw nut 105 further defines worm gear threads 109 in an outer circumferential surface 108, and the lead screw nut cavity 51 communicates with a transversely extending worm gear channel 37 defined in the gearbox 20, so that the worm gear threads 109 defined in the lead screw nut 105 operatively engage with worm gear threads 56 defined in a worm gear 45 carried in the transversely extending worm gear channel 37 defined in the gear box 20; and the worm gear 45 is barrel shaped in configuration and has a first end portion 46 and a second end portion 47 and a socket pinion 50 extends axially from the second end portion 47 and the worm gear 45 defines worm gear threads 56 in an outer circumferential surface that operatively threadably communicate with the worm gear threads 109 defined in the lead screw nut 105 so that rotational motion is threadably communicated therebetween; a positionally adjustable hand crank 140 that extends proximate the outer circumferential surface 14 of the body 10, is interconnected with the axially extending socket pinion 50, the hand crank 140 having a socket 141 that has a first end portion 142 and a second end portion 143, and the first end portion 142 is engaged with the axially extending socket pinion 50, and the second end portion 143 defines a diametrically extending through hole 144 to adjustably positionally engage with an elongate second arm 146, and an axially aligned hole 145 for a threaded set screw 153, the elongate second arm 146 has a first end portion 147 and a second end portion 148 that defines plural spacedly arrayed bends 149, and the first end portion 147 defines a first 151 and a second 152 diametrically extending through hole for the threaded set screw 153, and the first hole 151 is aligned axially perpendicular relative to the second hole 152, and the second end portion 148 of the elongate second arm 146 carries a hand grip 150 at a terminal end thereof, and the elongate second arm 146 is positionally adjustable relative to the socket 141 by predetermined alignment of the first and second through holes 151, 152 relative to the axially aligned hole 145 of the socket 41 and engagement of the threaded set screw 153 therein so that rotation of the hand crank 140 responsively axially rotates the worm gear 45, and the axial rotational motion of the worm gear 45 is threadably communicated to the lead screw nut 105 which responsively communicates the rotational motion to the lead screw 60, which responsively causes the lead screw 60 to move axially, and without rotation, in a first direction, and in a second direction, responsive to the rotation of the hand crank 140, and the rotation of the hand crank 140 and axial rotation of the worm gear 45 is in a direction that is perpendicular to the axial movement of the lead screw 60; and the lead screw 60 carries, at its second end portion 62, a valve body 85, the valve body 85 having an outwardly downwardly tapered first end portion 86, a medial portion 88, an inwardly downwardly tapered second end portion 87 with a plunger engaging flange 89 at the second end portion 87, a pressure relief channel 91 defined in the valve body 85 communicates between the second end portion 87 which defines a pressure relief entrance orifice 93 and the medial portion 88 which defines a pressure relief exit orifice 92, the pressure relief channel 91 defines an interior surface 95 at the pressure relief entrance 93, and a ball bearing seal 96 is carried within the pressure relief channel 91, the ball bearing seal 96 having a diameter 97 that frictionally communicates with interior surfaces 95 of the pressure relief entrance orifice 93 to provide a fluid tight seal therebetween, and the ball bearing seal 96 is positionally maintained in frictional communication with the interior surface 95 by a biasing spring 98 that has a predetermined compression strength of approximately between approximately 10 bar (approximately 145 psi) and approximately 11 bar (approximately 160 psi), and the valve body 85, at the first end portion 86, carries a spider ring spring 120; and the spider ring spring 120 has a spider ring hub 121 that defines a medial channel 122 through which the second end portion 62 of the lead screw 60 extends, the spider ring spring 120 further having a valve body engaging edge portion 123 and plural spacedly arrayed spider ring arms 124, each of the plural spacedly arrayed spider ring arms 124 having a second inner arm portion 127, and a first outer arm portion 126, and each first outer arm portion 126 terminates at an end portion 125 that communicates with a plunger 70, and the spider ring spring 120 movably interconnects the valve body 85 and the plunger 70; and the plunger 70 is generally annular in configuration and has a first upper surface 71 proximate the valve body 85 that defines and inwardly downwardly tapered depression 76, and has a second lower surface 72 opposite the valve body 85, and the plunger 70 defines a medial axial channel 82 that operatively communicates with the second end portion 87 of the valve body 85, and the plunger 70 has a diameter 81 with an outer circumferential edge 73, the outer circumferential edge 73 defining an O-ring channel 74, that carries an O-ring 75 therein, and the inwardly downwardly tapering depression 76 of the plunger 70 defines an annular fluid seal groove 77 which carries a seal 78 therein to provide a fluid tight seal between the plunger 70 and the plunger engaging flange 89 of the valve body 85, and the plunger 70 defines plural spacedly arrayed spider arm latches 80 in the outer circumferential edge 73, each of the spacedly arrayed spider arm latches 80 configured to engage with a terminal end portion 125 of one of the plural spacedly arrayed spider arms 124 of the spider ring spring 120, and wherein an angle 131 between the first outer arm 126 and the second inner arm 127 of the spider ring spring 120 biases the plunger 70 in a direction away from engagement with the valve body 85 so that a gap 101 is defined between the valve body 85 and the inwardly tapered depression 76 defined in the first upper surface 71 of the plunger 70 so that liquid may flow therebetween from a position in in a pressure cylinder 160 above the plunger 70 to a position in a medial channel 164 of the pressure cylinder 160 vertically below the plunger 70 when the plunger 70 is in a first position, and when the plunger 70 is in a second position, the biasing of the spider ring spring 120 is overcome responsive to axial downward movement of the valve body 85 toward the second end portion 12 of the body 10, and the gap 101 is closed and the valve body 85 is sealingly engaged with the plunger 70 so that fluid/liquid cannot pass therebetween; and the pressure cylinder 160 is preferably formed of stainless steel, is elongate and cylindrical and has an inner wall 175 and an outer wall 176 with a thermally insulating void 177 therebetween, the outer wall 176 has an outer circumferential surface 165, and the inner wall 175 has an inner circumferential surface 167, the pressure cylinder 160 is externally threaded at the first end portion 161 and is internally threaded at the second end portion 162, the pressure cylinder 160 first end portion 161 is threadably interconnected with the second lower end portion 22 of the gear box 20, and the pressure cylinder 160 defines a medial channel 164 that is defined by the inner circumferential surface 167 of the inner wall 175 and the medial channel 164 extends between the first end portion 161 and the second end portion 162, the medial channel 164 having an inner diameter 168 that is substantially the same as the plunger diameter 81 so that a fluid tight seal is maintained between the inner circumferential surface 167 and the O-ring 75 carried in the O-ring channel 74 defined in the outer circumferential edge 73 of the plunger 70, as the plunger 70 moves axially within the medial channel 164 of the pressure cylinder 160 responsive to rotation of the hand crank 140 and axial movement of the lead screw 60, the pressure cylinder 160 further having a radially reduced shoulder 169 at the first end portion 161 with the threads 170 defined in the radially reduced shoulder 169, and having a radially enlarged inner shoulder 171 at the second end portion 162, the radially enlarged inner shoulder 171 defining threads 172 on an inner circumferential surface thereof, and the radially enlarged inner shoulder 171 defining a seal groove 173 carrying a seal 174 therein to provide a fluid tight threaded interconnection between the pressure cylinder 160 and a portafilter frame 180; and the portafilter frame 180 is threadably interconnected to the second end portion 162 of the pressure cylinder 160, the portafilter frame 180 having a first end portion 181, a medial portion 183, and a second end portion 182 and defines a medial channel 185 that has a diameter 186, and has an exterior circumferential surface 184 and an opposing interior circumferential surface 187, the portafilter frame 180 further has a radially reduced shoulder 188 at the first end portion 181 with threads 189 defined in the radially reduced shoulder 188, and the portafilter frame 180 has a radially reduced shoulder 190 at the second end portion 182 that defines threads 191, the portafilter frame 180 carries a removable particulate basket 200 within the medial channel 185, the removable particulate basket having an upper end portion 201 with a radially enlarged securement lip 202 that carries a fluid seal (not shown) thereon, the removable particulate basket 200 defining a medial particulate cavity 205 and a plurality of spacedly arrayed holes 204 are defined within the removable particulate basket 200 for passage of infused liquid there-through and into a carafe 220; and the carafe 220 is threadably interconnected to the radially reduced shoulder 190 at the second end portion 182 of the portafilter frame 180 and the carafe 220 collects the infused fluid passing through the removable particulate basket 200, a flexible vented gasket 192 is carried between the carafe 220 and the portafilter frame 180 to allow escape of pressurized vapor, the fluid carafe 220 is generally cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 defines threads 229 that engage with the threads 191 of the portafilter frame 180, the carafe 220 further having gripping features 230 on the exterior circumferential surface 224 to promote gripping by a user for detachment from, and attachment to, the portafilter frame 180.

A further aspect of the present invention is to provide an apparatus for making espresso wherein the gearbox 20 provides a gear ratio between rotation of the hand crank 140 and axial movement of the lead screw 60 of approximately one revolution of the hand crank 140 is equal to 1.6 mm of plunger travel.

A further aspect of the present invention is to provide an apparatus for making espresso wherein the gearbox 20 provides a gear ratio between rotation of the hand crank 140 and axial movement of the lead screw 60 so as to generate pressure within the pressure cylinder 160 and below the plunger 70 of approximately 130 psi.

A still further aspect of the present invention is to provide an apparatus for infusing a liquid and further comprising: a tamper 250 that threadably releasably interconnects with the portafilter frame 180, the tamper 250 defining a medial axial chamber 255 and the tamper 250 carries a spring biased and axially adjustably positionable base 263 within the medial axial chamber 255, the base 263 having a diameter that is substantially the same as the diameter of the removable particulate basket 200; and engagement of the tamper 250 with the portafilter frame 180 causes the base 263 to exert compressive axial pressure on particulate within the removable particulate basket 200 medial particulate cavity 205.

An even still further aspect of the present invention is to provide a tamper 250 releasably interconnectable to the portafilter frame 180 to compress particulate therein, the tamper 250 comprising: a locking ring 252 having a first end portion 253, a second end portion 254 and defining a medial channel 255, the first end portion 253 having a first outer circumferential surface 256, defining first interior threads 258 and defining a first interior diameter 260, and the second end portion 254 having a second outer circumferential surface 257, defining second interior threads 259 and defining a second interior diameter 261 that is greater than the first interior diameter 260; a base 263 that is adjustably positionally carried within the medial channel 255 of the locking ring 252, the base 263 having a first end portion 264 and a second end portion 265 and defining a medial chamber 270 that has an interior bottom surface 271 with a medial cylinder 272 extending axially there from, the first end portion 264 of the base 263 having a first outer circumferential surface 266 and a first outer diameter 267, and the second end portion 265 of the base 263 has a second outer circumferential surface 268 and a second outer diameter 269, and the medial axially extending cylinder 272 defines a medial channel 272A that defines an interior diameter 273; a preload spring 277 having a predetermined compression strength carried on the medial cylinder 272 that extends axially from the interior bottom surface 271 of the medial chamber 270; a spring plate 278 that engages with both the preload spring 277 and a medial channel 272A defined by the medial cylinder 272, the spring plate 278 having a first end portion 279 and a second end portion 280, and a radially enlarged shoulder 283 on an outer circumferential surface 278A between the first end portion 279 and the second end portion 280, the second end portion 280 defining a diameter 281 that allows axial engagement with the medial channel 272A of the medial cylinder 272, and defining a threaded medial axial channel 282; a retention spring 285 having a predetermined compression strength carried on the spring plate 278 and communicating with the radially enlarged shoulder 283 opposite the base 263; a tamper grip 287 that engages with both the retention spring 285 and the spring plate 278 opposite the base 263, the tamper grip 287 having a first axial end portion 288 and a second end portion 289 defining an opening to a medial chamber 290 that is defined by an interior axial surface 291 and a threaded inner circumferential surface 298, the interior axial surface 291 defining a medial axial hole 292 having a countersunk shoulder 292A that has plural spacedly arrayed detents 293, the medial chamber 290 further defining a threaded cylinder 294 that extends axially from the interior axial surface 291, and toward the second end portion 289 the threaded cylinder 294 defining a diameter 296, exterior threads 295 and having alignment lugs 297 that engage with mating alignment notches 275 defined in the base 263; and a preload screw 299 that extends through the medial axial hole 292 of the tamper grip 287 and engages in the threaded medial axial channel 282 of the spring plate 278 and with the base 263, the preload screw 299 having a threaded shaft 300 with a terminal end 301, and a radially enlarged head 302 opposite the terminal end 301, the radially enlarged head 302 defining a tool engaging feature 303 on a surface opposite the threaded shaft 300, and the radially enlarged head 302 defines an alignment indicator 304 to cooperate with the plural spacedly arrayed detents 293 defined in the tamper grip 287 to provide predetermined information to a use.

These and other aspects of the invention are more fully disclosed and described herein.

BRIEF DESCRIPTION OF THE DRAWINGS

Exemplary embodiments of the invention are described, in more detail below, with reference to the accompanying Figures.

The Figures show a preferred embodiments of the invention in which individual features of the present invention are illustrated and are identified by element numbers. Functionally similar elements are denoted by the same reference signs in the various Figures.

DETAILED DESCRIPTION OF THE PREFERRED EMBODIMENTS

Figure 1:
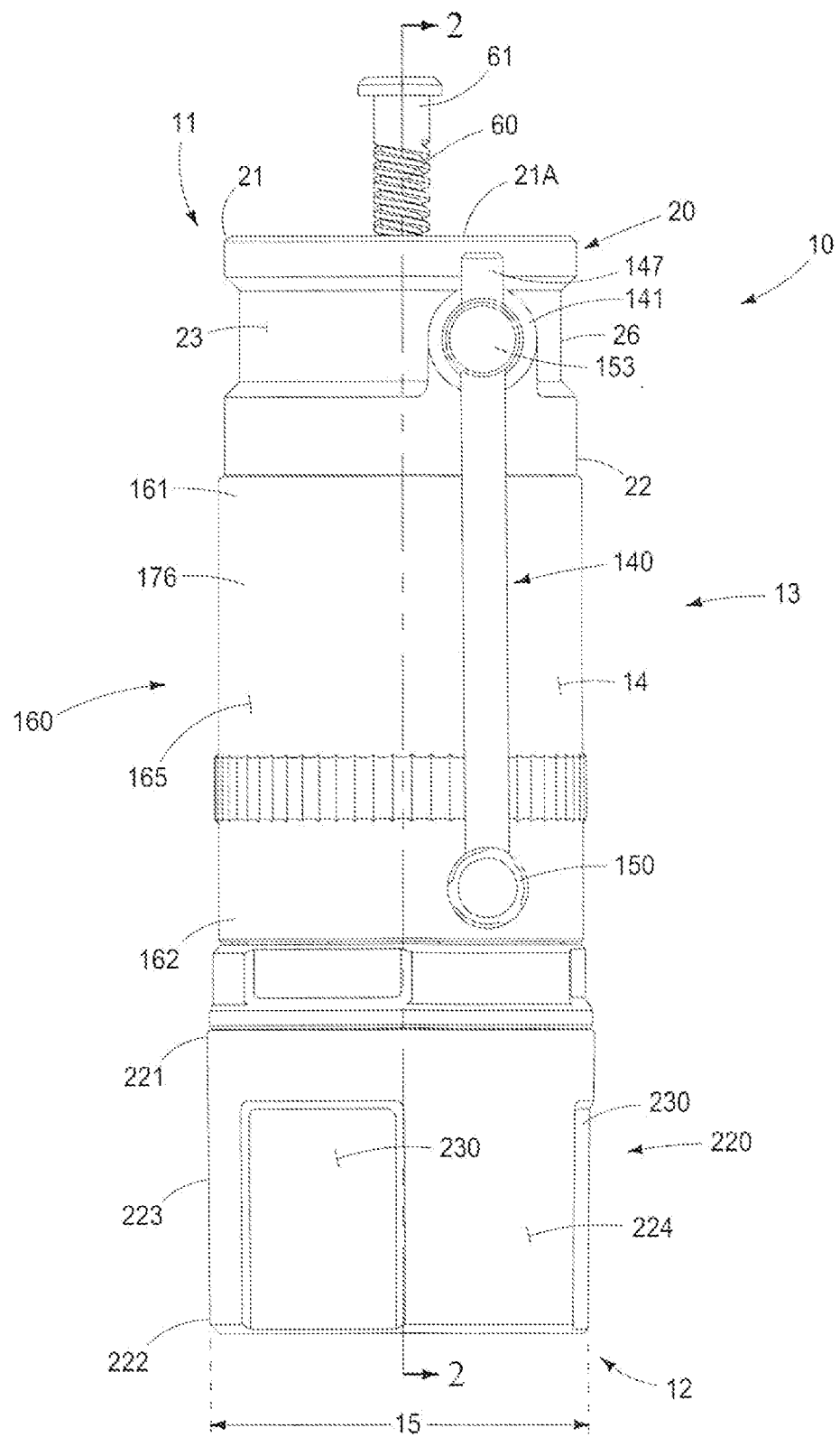
FIG. 1 is an orthographic side view of the body and its various components in an assembled state.

This disclosure of the invention is submitted in furtherance of the Constitutional purposes of the U.S. Patent Laws "to promote the progress of science and useful arts" (Article 1, Section 8).

An apparatus for infusing a liquid, generally provides a body 10, a gear box 20, a lead screw 60, a hand crank 140, a valve body 85, a plunger 70, a pressure cylinder 160, a portafilter frame 180 carrying a removable particulate basket 200, a carafe 220 and a tamper 250.

Best shown in FIG. 1, the body 10 is generally cylindrical and elongate in configuration and provides a first end portion 11, a medial portion 13, and a second end portion 12, the body 10 further having a diameter 15 and an outer circumferential surface 14 that defines gripping features.

Figure 5:
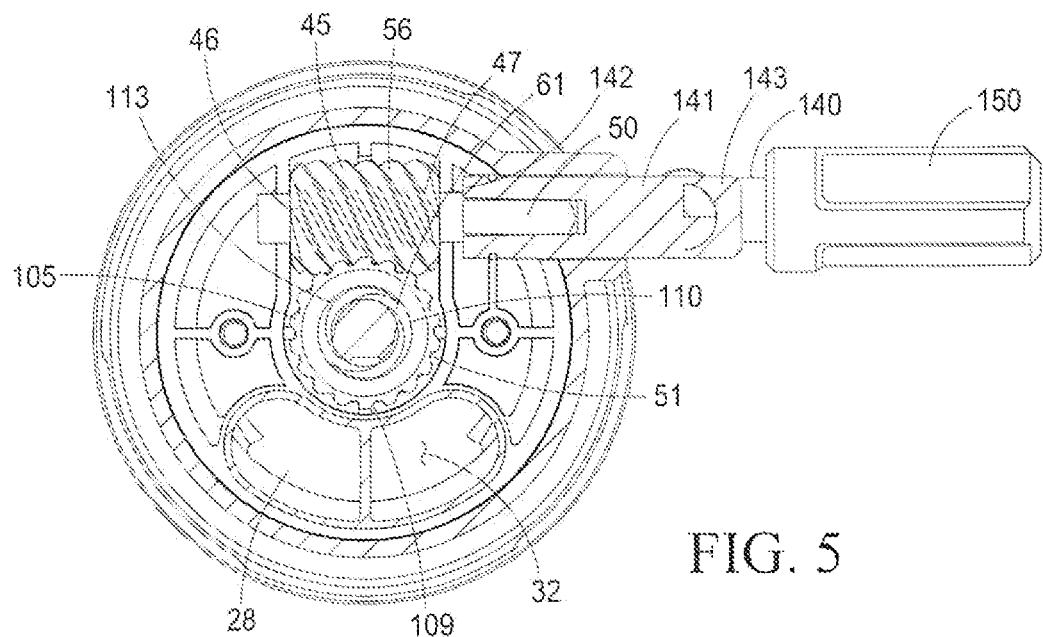
FIG. 5 is an orthographic cross-sectional plan view of the body, showing the internal components of the gearbox.

The gear box 20 is carried at the first end portion 11 of the body 10. The gear box 20 has an outer circumferential surface 23, a first end portion 21 that has an upper surface 21A that defines a recessed liquid receiving depression 27, and a second end portion 22 that has a lower surface 22A. A radially reduced exterior medial portion 26 is between the first end portion 21 and the second end portion 22, and a liquid drain 28 (FIG. 5) is defined within the liquid receiving depression 27. The liquid drain 28 defines a liquid channel 32 that communicates between the recessed liquid receiving depression 27 and the lower surface 22A for liquid to pass there-through. The gear box 20 further defines an axially aligned lead screw channel 38 that extends between the upper and lower anti-rotation surfaces 21A, 22A, the lead screw channel 38 has a radially inwardly extending lead screw key (not shown) that slidably engages in an axial keyway 66 defined in an axially movable lead screw 60 that is carried within the lead screw channel 38. The gearbox 20 provides a gear ratio between rotation of the hand crank 140 and axial movement of the lead screw 60 of approximately 1.6 mm/rev. The gear ratio between rotation of the hand crank 140 and axial movement of the lead screw 60 generates pressure within the pressure cylinder 160 and below the plunger 70 of approximately 130 psi.

Figure 2:
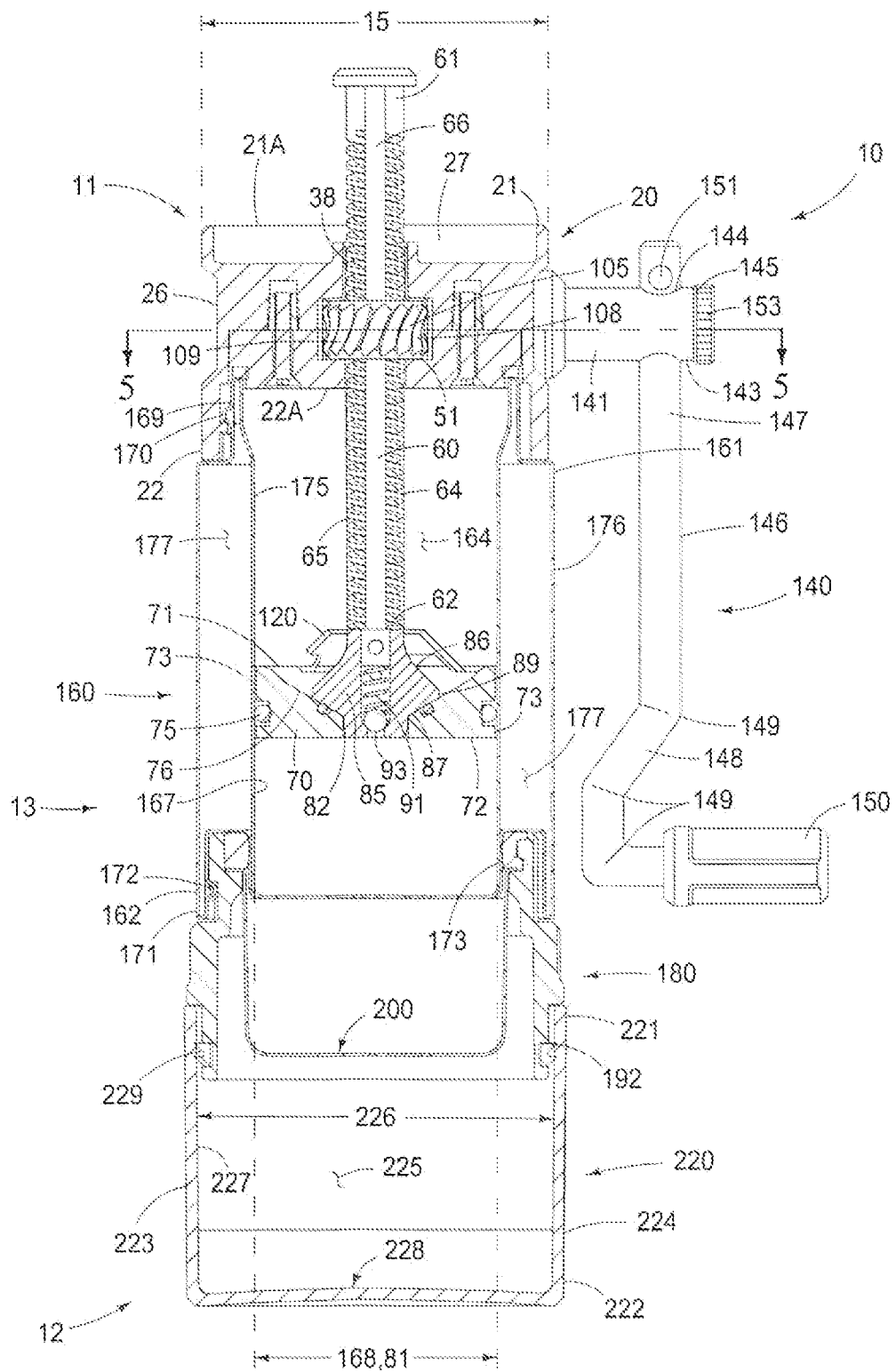
FIG. 2 is a cross sectional view of the body, taken on line 2-2 of FIG. 1 and showing the plunger and a valve body sealingly interconnected.

Best shown in FIG. 2, the lead screw 60 is elongate and has a first end portion 61 and a second end portion 62, defines threads 65 in an outer circumferential surface 64, and defines an axially aligned anti-rotation key-way 66 that extends between the first end portion 61 and the second end portion 62. The first end portion 61 of the lead screw 60 may be radially enlarged, or otherwise configured to prevent the lead screw 60 from being completely withdrawn from engagement with the gear box 20. The anti-rotation key-way 66 slidably engages with the lead screw key (not shown) to prevent the lead screw 60 from rotating axially. The lead screw 60 is carried within and extends axially though the lead screw channel 38 and extends axially outwardly from both the first end portion 21 and the second end portion 22 of the gear box 20, and the lead screw 60 threadably communicates with a lead screw nut 105 that is rotatably carried on rotation bushings 52 in a lead screw nut cavity 51 defined in the gear box 20.

The lead screw nut 105 (FIGS. 3-5) defines a medial axial channel 110 through which the lead screw 60 axially extends. Threads 113 defined in an inner circumferential surface (not shown) of the medial axial channel 110 operatively engage with the threads 65 defined in the outer circumferential surface 64 of the lead screw 60 so that the lead screw 60 and the lead screw nut 105 move relative to one another responsive to axial rotation of the lead screw nut 105. The lead screw nut 105 further defines worm gear threads 109 in an outer circumferential surface 108. The lead screw nut cavity 51 communicates with a generally transversely extending worm gear channel 37 defined in the gearbox 20, so that the worm gear threads 109 defined in the lead screw nut 105 operatively engage with threads 56 defined in a worm gear 45 carried in the generally transversely extending worm gear channel 37 defined in the gear box 20.

The worm gear 45 (FIGS. 4, 5) is somewhat barrel shaped in configuration and has a first end portion 46 and a second end portion 47 and a socket pinion 50 extends axially from the second end portion 47. The worm gear 45 defines worm gear threads 56 in an outer circumferential surface that operatively threadably communicate with the worm gear threads 109 defined in the lead screw nut 105 so that rotational motion is threadably communicated therebetween.

The hand crank 140 (FIGS. 1, 2, 5) is positionally adjustable and extends proximate the outer circumferential surface 14 of the body 10, and is interconnected with the axially extending socket pinion 50. The hand crank 140 has a socket 141 that has a first end portion 142 and a second end portion 143, and the first end portion 142 is engaged with the axially extending socket pinion 50, and the second end portion 143 defines a diametrically extending through hole 144 to adjustably positionally engage with an elongate second arm 146, and an axially aligned hole 145 for a threaded set screw 153; the elongate second arm 146 has a first end portion 147 and a second end portion 148 that defines plural spacedly arrayed bends 149, and the first end portion 147 defines a first 151 and a second (not shown) diametrically extending through hole for the threaded set screw 153 to extend therethrough, and the first hole 151 is aligned axially perpendicular relative to the second hole (not shown), and the second end portion 148 of the elongate second arm 146 carries a hand grip 150 at a terminal end (not shown) thereof. Positional alignment of each of the first or second through holes 151, 152 with the threaded axial hole 145 and engagement of the threaded set screw 153 therein, allows the hand crank 140 to be positioned in either a first to use position wherein the hand grip 150 is easily accessible and positioned for rotation of the hand crank 144 use of the apparatus, and a second storage position wherein the hand grip 150 is positioned closely adjacent to the outer circumferential surface 14 of the body 10 to reduce space and facilitate ease of storage/transport of the apparatus.

Rotation of the hand crank 140, responsively axially rotates the worm gear 45, and the axial rotational motion of the worm gear 45 is threadably communicated to the lead screw nut 105 which responsively communicates the rotational motion to the lead screw 60, which responsively causes the lead screw 60 to move axially, without axial rotation, in a first direction, and in a second direction, responsive to the rotation of the hand crank 140, and the rotation of the hand crank 140 and axial rotation of the worm gear 45 is in a direction that is perpendicular to the axial movement of the lead screw 60.

Figure 6:
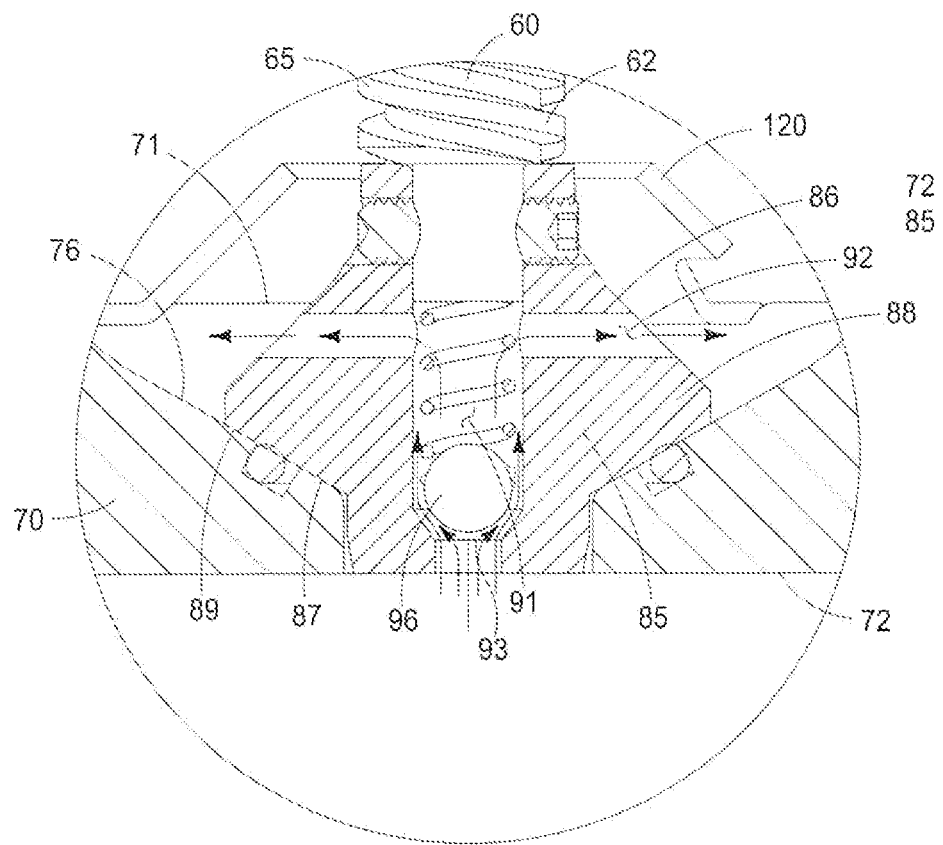
FIG. 6 is an enlarged cross sectional view of the valve body and plunger of FIG. 4.
Figure 11:
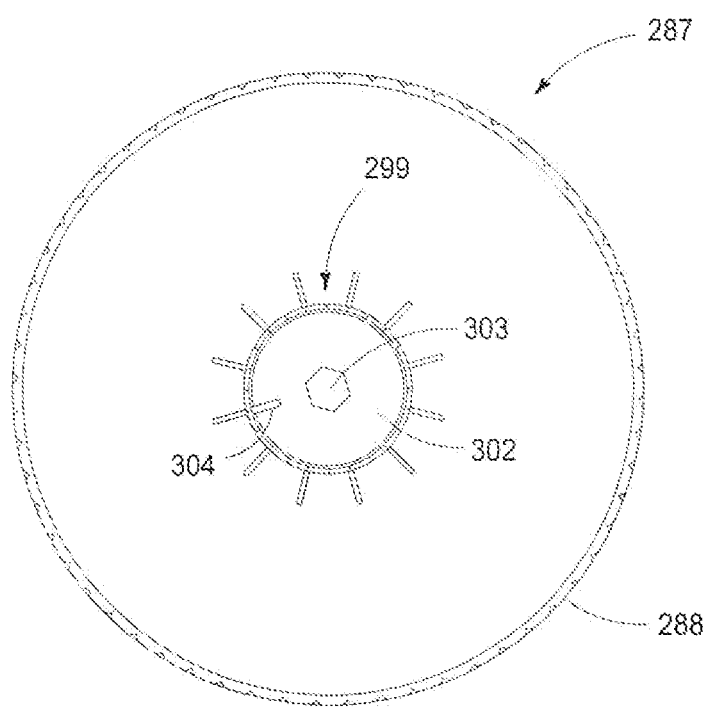
FIG. 11 is a top plan view of the tamper of FIG. 9.

Best shown in FIG. 11, the lead screw 60 carries, at its second end portion 62, a valve body 85 that has an outwardly downwardly tapered first end portion 86, a medial portion 88, an inwardly downwardly tapered second end portion 87 with a plunger engaging flange 89 at the second end portion 87. A pressure relief channel 91 defined in the valve body 85 communicates between the second end portion 87 which defines a pressure relief entrance orifice 93 and the medial portion 88 which defines a pressure relief exit orifice 92 (See FIG. 6), the pressure relief channel 91 defines an interior diameter 95 at the pressure relief entrance 93. A ball bearing seal 96 is carried within the pressure relief channel 91, the ball bearing seal 96 having a diameter 97 that frictionally communicates with interior diameter 95 of the pressure relief entrance orifice 93 to provide a fluid tight seal therebetween. The ball bearing seal 96 is positionally maintained in frictional communication with the interior surface by a biasing spring 98 that has a predetermined compression strength of approximately between approximately 145 psi, and approximately 160 psi.

The valve body 85, at the first end portion 86, carries a spider ring spring 120 that communicates with the plunger 70 and which interconnects the valve body 85 to the plunger 70.

Figure 12:
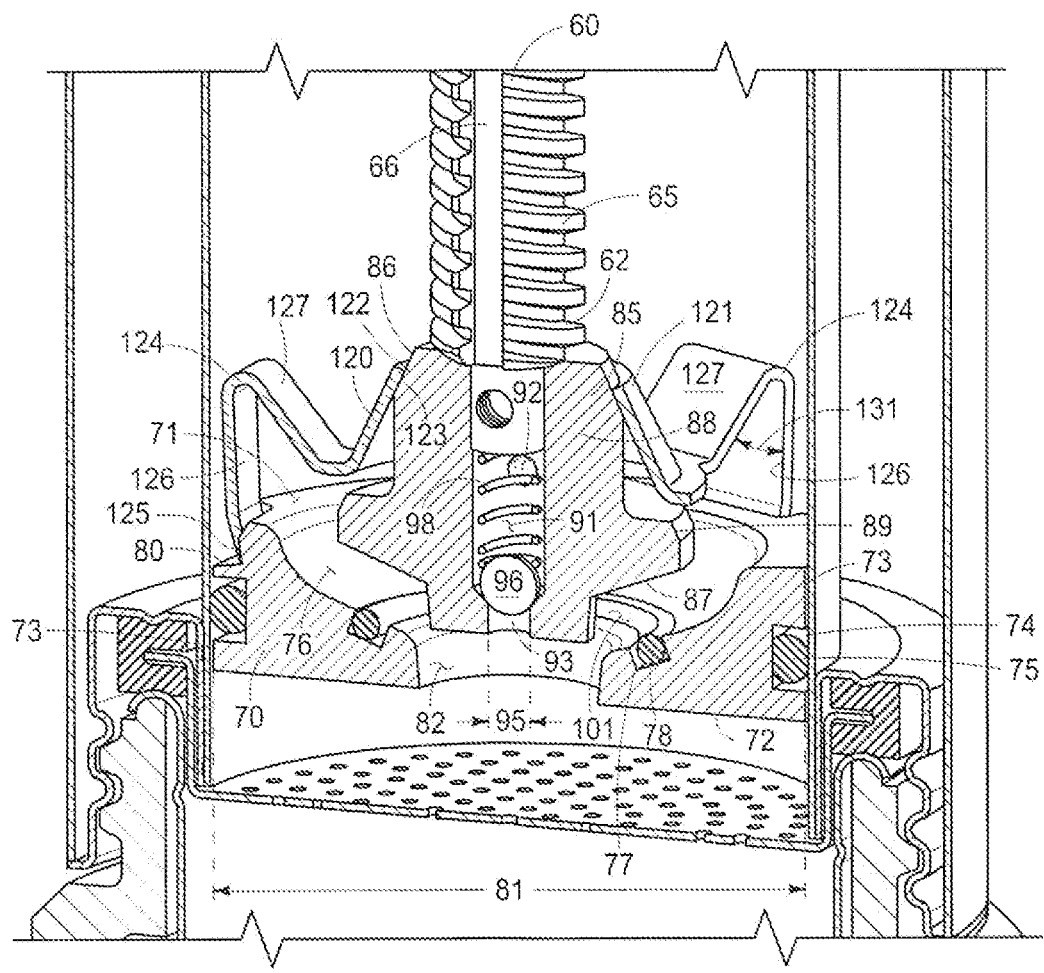
FIG. 12 is an enlarged perspective cross section view of the valve body, the plunger and the interconnection with the porta filter frame showing the valve body positionally biased away from the plunger by the spider ring spring forming the gap therebetween for passage of fluid therebetween.
Figure 13:
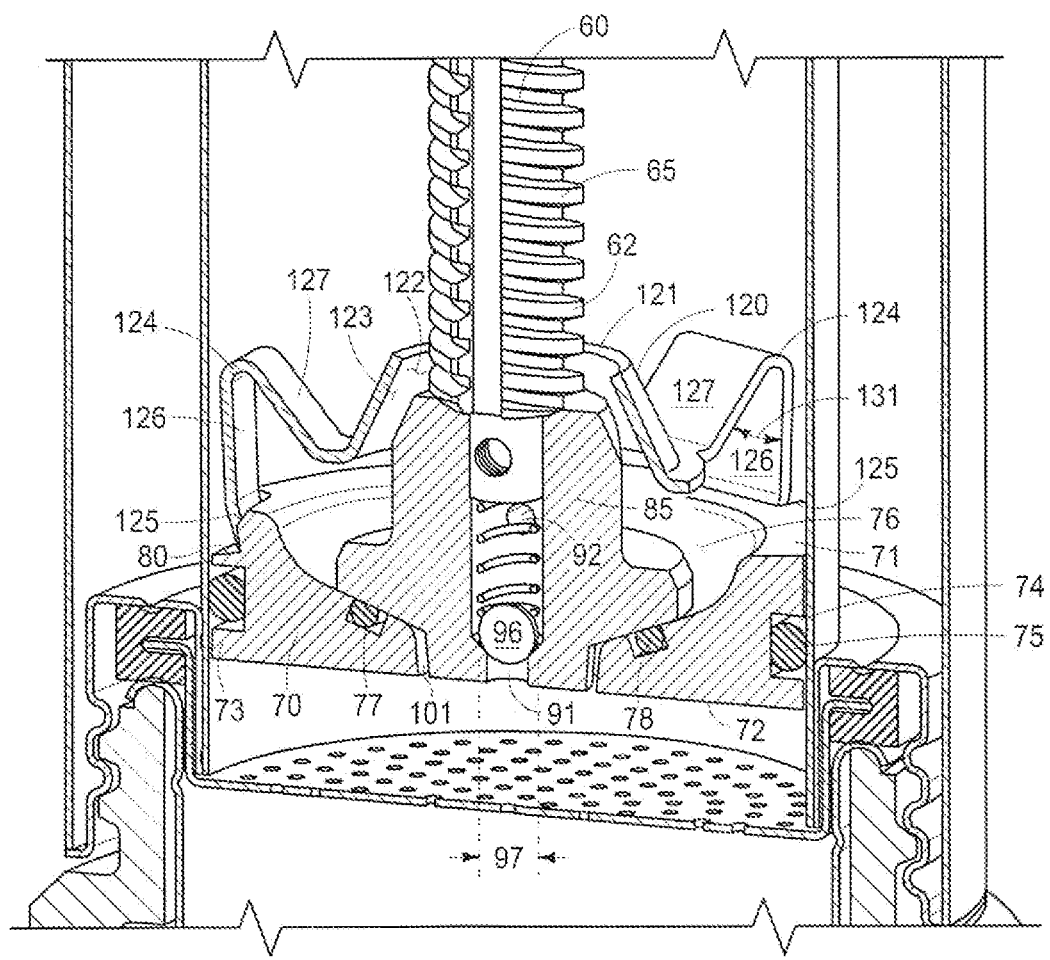
FIG. 13 is an enlarged perspective cross section view, similar to that of FIG. 11 showing the valve body sealingly engaged with the plunger and closing the gap.
Figure 14:
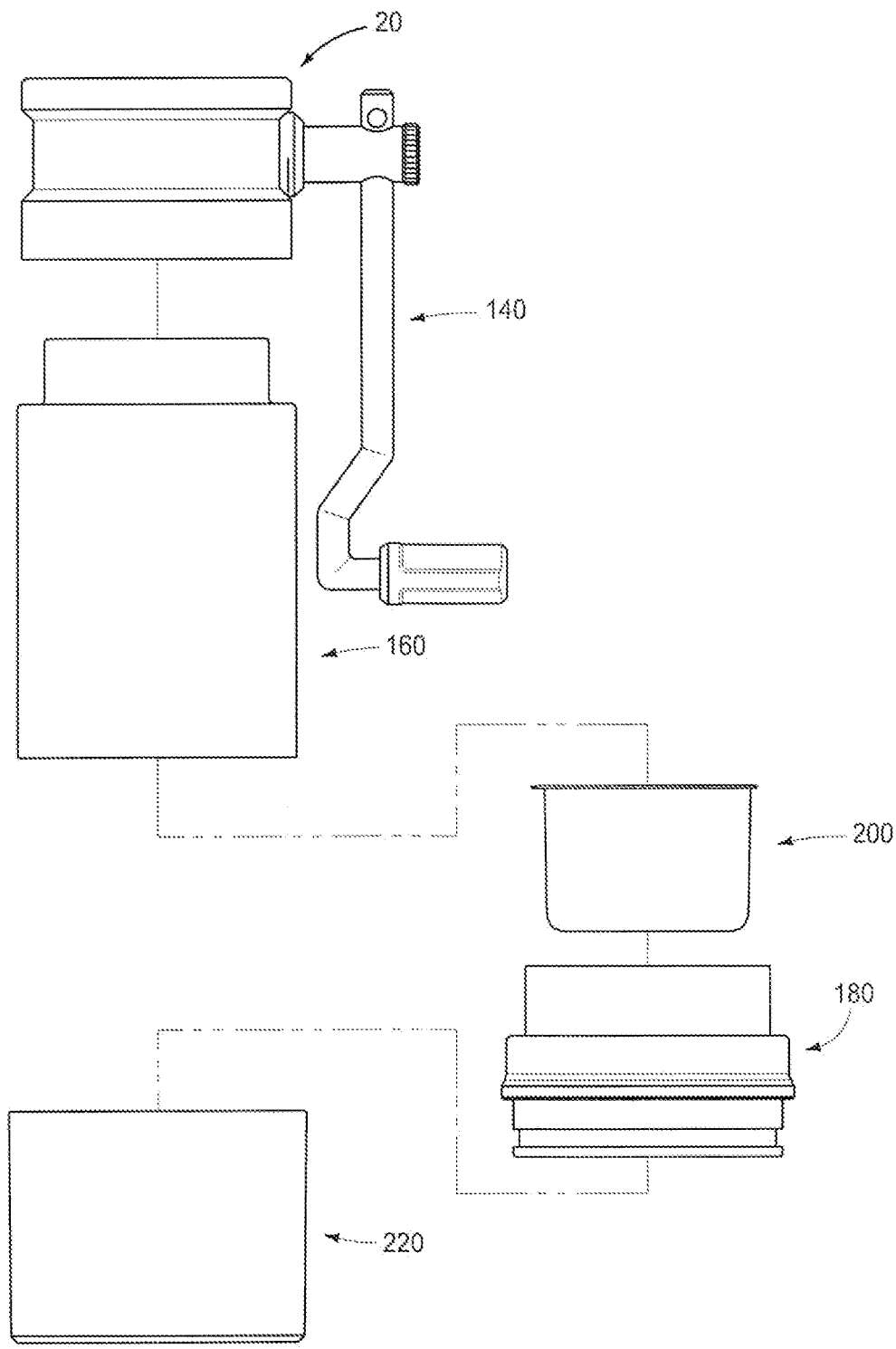
FIG. 14 is a generalized block diagram showing the arrangement of the various components.

Best shown in FIGS. 11 and 12, the spider ring spring 120 has a spider ring hub 121 that defines a medial channel 122 through which the second end portion 62 of the lead screw 60 extends. The spider ring spring 120 has a valve body engaging edge portion 123 and plural spacedly arrayed spider ring arms 124, each of the plural spacedly arrayed spider ring arms 124 having a second inner arm portion 127, and a first outer arm portion 126, and each first outer arm portion 126 terminates at an end portion 125 that communicates with a plunger 70, and the spider ring spring 120 movably interconnects the valve body 85 and the plunger 70, and may bias the position of the plunger 70 away from the valve body 85. The biasing of the spider ring spring 124 is overcome by downward axial movement of the valve body 85.

The plunger 70 is generally annular in configuration and has a first upper surface 71 proximate the valve body 85 that defines and inwardly downwardly tapered depression 76, and has a second lower surface 72 opposite the valve body 85. The plunger 70 defines a medial axial channel 82 that operatively communicates with the second end portion 87 of the valve body 85. The plunger 70 has a diameter 81 with an outer circumferential edge 73. The outer circumferential edge 73 defines an O-ring channel 74, that carries a seal 75 therein which is preferably an O-ring 75. The inwardly downwardly tapering depression 76 defines an annular fluid seal groove 77 which carries a seal 78 therein to provide a fluid tight seal between the plunger 70 and the plunger engaging flange 89 of the valve body 85 when the valve body 85 is in the sealing position (FIG. 12). The plunger 70 defines plural spacedly arrayed spider arm latches 80 proximate the outer circumferential edge 73, and each of the spacedly arrayed spider arm latches 80 is configured to engage with terminal end portions 125 of the plural spacedly arrayed spider arms 124 of the spider ring spring 120. An angle 131 between the first outer arm 126 and the second inner arm 127 of the spider ring spring 120 may bias the plunger 70 in a direction away from engagement with the valve body 85 so that a gap 101 is defined between the valve body 85 and the inwardly tapered depression 76 defined in the first upper surface 71 of the plunger 70 so that liquid may flow therebetween from a position in a pressure cylinder 160 above the plunger 70 to a position in the pressure cylinder 160 vertically below the plunger 70. FIG. 11 shows the gap 101 open, and FIG. 12 shows the gap 101 closed wherein any positionally biasing of the spider ring spring 120 is overcome, responsive to downward axial movement of the valve body 85 responsive to rotation of the hand crank 140. When the gap 101 is closed (FIG. 12) the valve body 85 and plunger 70 are sealingly interconnected so that fluid/liquid cannot flow/past therebetween.

The pressure cylinder 160 is preferably formed of stainless steel, is elongate and cylindrical and has an inner wall 175 and an outer wall 176 with a thermally insulating void 177 therebetween. The outer wall 176 has an outer circumferential surface 165, and the inner wall 175 has an inner circumferential surface 167. The pressure cylinder 160 is externally threaded at the first end portion 161 and is internally threaded at the second end portion 162. The pressure cylinder 160 first end portion 161 is threadably interconnected with the second lower end portion 22 of the gear box 20. The pressure cylinder 160 defines a medial channel 164 that is defined by the inner circumferential surface 167 of the inner wall 175 and the medial channel 164 extends between the first end portion 161 and the second end portion 162. The medial channel 164 defines an inner diameter 168 that is substantially the same as the plunger diameter 81 so that a fluid tight seal is maintained between the inner circumferential surface 167 and the O-ring seal 75 carried in the O-ring channel 74 defined in the outer circumferential edge 73 of the plunger 70, as the plunger 70 moves axially within the medial channel 164 of the pressure cylinder 160 responsive to rotation of the hand crank 140 and axial movement of the lead screw 60. The pressure cylinder 160 further has an outer radially reduced shoulder 169 at the first end portion 161 with the threads 170 defined in the outer radially reduced shoulder 169, and has an inner radially enlarged shoulder 171 at the second end portion 162, the inner radially enlarged portion 171 defining threads 172 on an inner circumferential surface thereof. The inner radially enlarged shoulder 171 defines a seal groove 173 carrying a seal 174 to provide a fluid tight threaded interconnection between the pressure cylinder 160 and a portafilter frame 180.

Although not shown in the drawings, it is expressly contemplated the body 10, and in particular the pressure cylinder 160 may have a thermally insulating exterior covering, such as, but not limited to a removable thermally insulating sleeve, or a permanently adhered thermally insulating covering. Such a thermally insulating exterior covering with serve to preserve the desired temperature of the liquid, and also protect a user during use.

Figure 3:
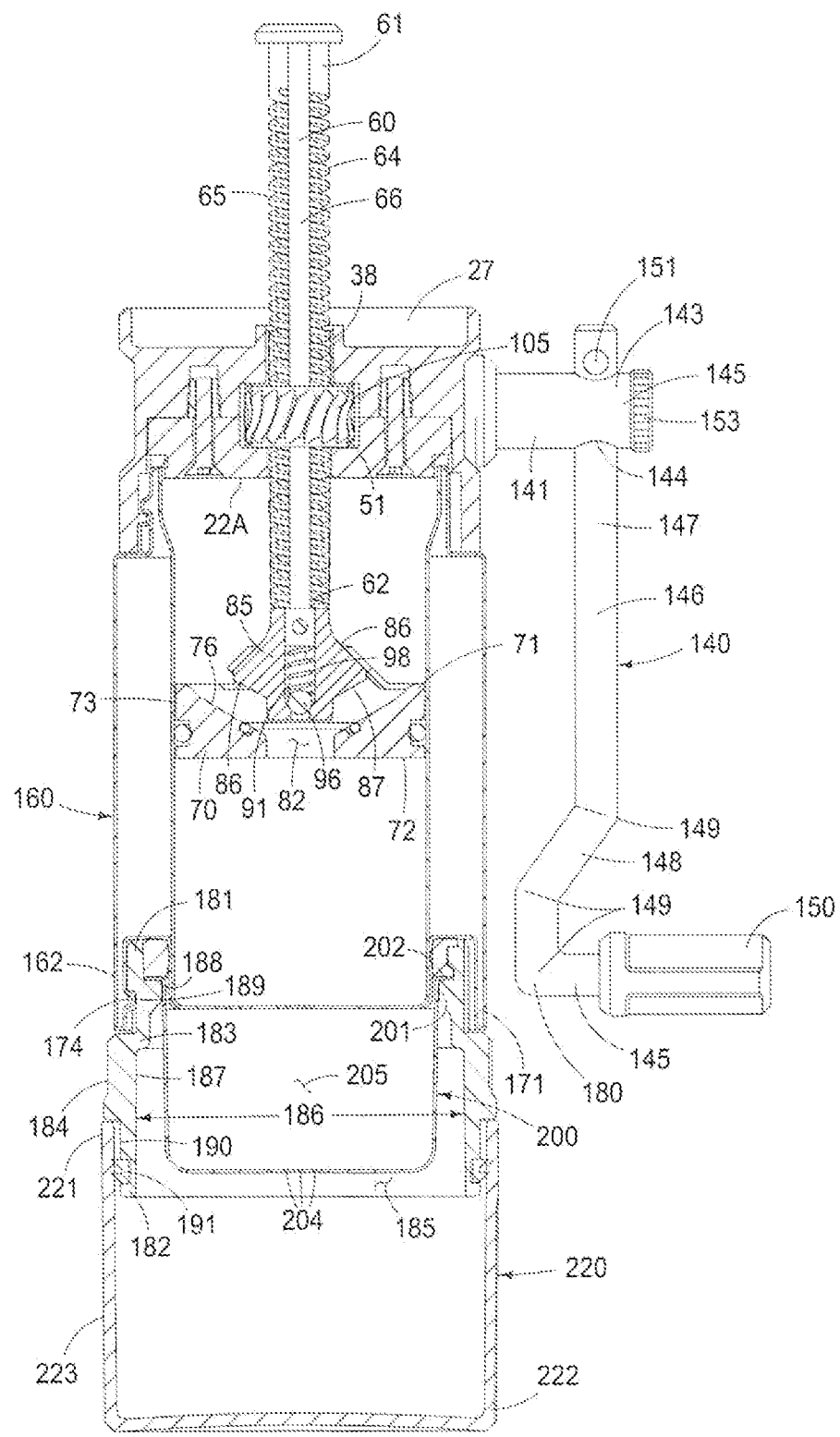
FIG. 3 is a cross sectional view, similar to that of FIG. 2 showing the plunger positionally biased away from the valve body by the spider ring spring.
Figure 4:
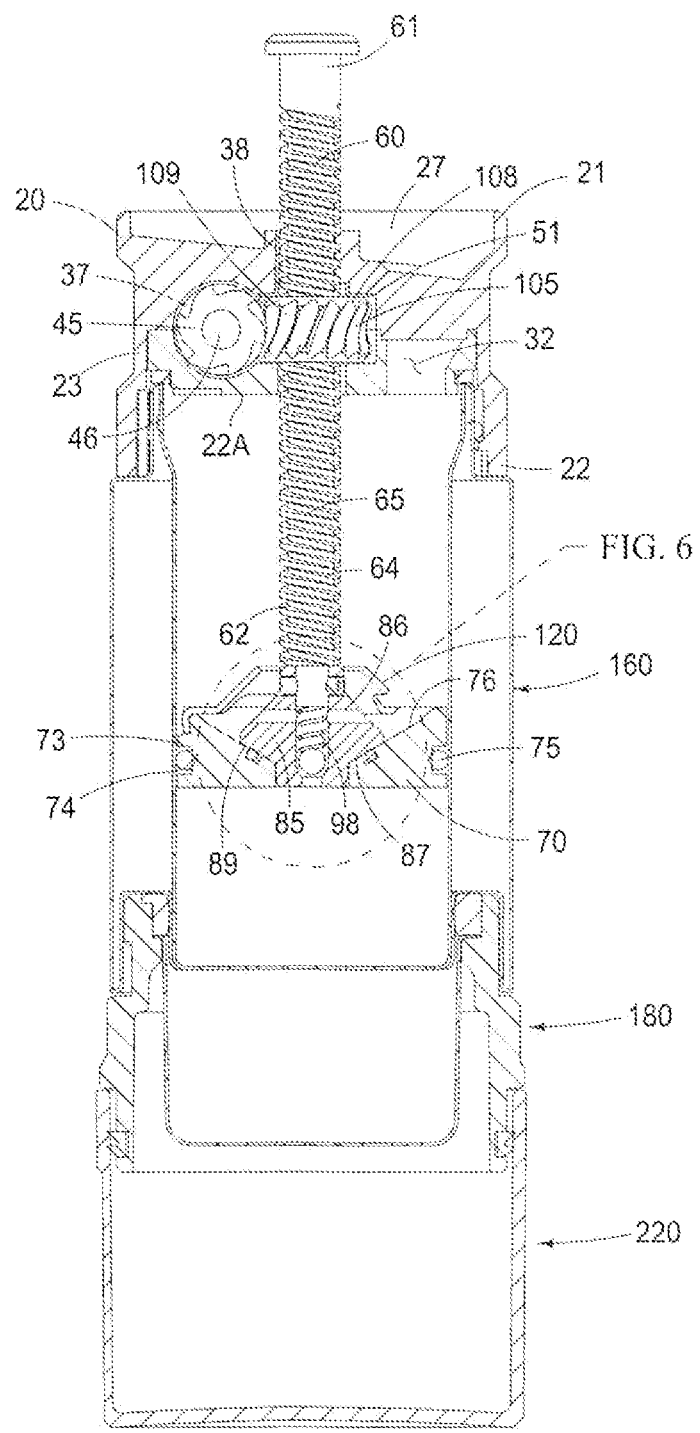
FIG. 4 is a cross sectional view, similar to that of FIG. 2 showing the body rotated axially 90°.

Best shown in FIGS. 2 and 3, the portafilter frame 180 is threadably interconnected to the second end portion 162 of the pressure cylinder 160. The portafilter frame 180 has a first end portion 181, a medial portion 183, and a second end portion 182 and defines a medial channel 185 that has a diameter 186, an exterior circumferential surface 184 and an opposing interior circumferential surface 187. The portafilter frame 180 further has a radially reduced shoulder 188 at the first end portion 181 with threads 189 defined in the radially reduced shoulder 188, and the portafilter frame 180 has a radially reduced shoulder 190 at the second end portion 182 that defines threads 191. The portafilter frame 180 carries a removable particulate basket 200 within the medial channel 185. The removable particulate basket has an upper end portion 201 with a radially enlarged securement lip 202 that carries a fluid seal (not shown) thereon, the removable particulate basket 200 defines a medial particulate cavity 205 for particulate, such as, but not limited to, ground coffee to be carried therein, and a plurality of spacedly arrayed holes 204 are defined within the removable particulate basket 200 for passage of infused liquid there-through and into a carafe 220.

The carafe 220 is generally cuplike in configuration and is releasably interconnected to the radially reduced shoulder 190 at the second end portion 182 of the portafilter frame 180. The releasable interconnection may be, without limitation, a threaded interconnection, a friction interconnection, a slide interconnection or any other known interconnection. The carafe 220 collects the infused fluid (not shown) passing through the removable particulate basket 200. A flexible vented gasket 192 is carried between the carafe 220 and the portafilter frame 180 to allow escape of pressurized vapor. The fluid carafe 220 has a first end portion 221, a medial portion 223, a second end portion 222, an exterior circumferential surface 224 and defines a liquid receiving cavity 225 between the first end portion 221 and an interior bottom surface 228 at the second end portion 222. The liquid receiving cavity 225 has an interior diameter 226 and an interior circumferential surface 227, and the first end portion 221 of the carafe 220 may define threads 229 that engage with the threads 191 of the portafilter frame 180. The carafe 220 preferably defines gripping features 230 in the exterior circumferential surface 224 to promote gripping by a user for detachment from, and attachment to, the portafilter frame 180.

Best shown in FIGS. 7-11, the tamper 250 is releasably interconnectable to the second end portion 182 of the porta filter frame 180 and is used to compress particulate, such as, but not limited to, ground coffee in the removable particulate basket 200. The tamper 250 generally provides a body 251 that comprises a tamper collar 252, a tamper base 263, a dome button 276, a preload spring 277, a preload plate 278, a retention spring 285, a tamper grip 287 and a preload screw 299.

Figure 8:
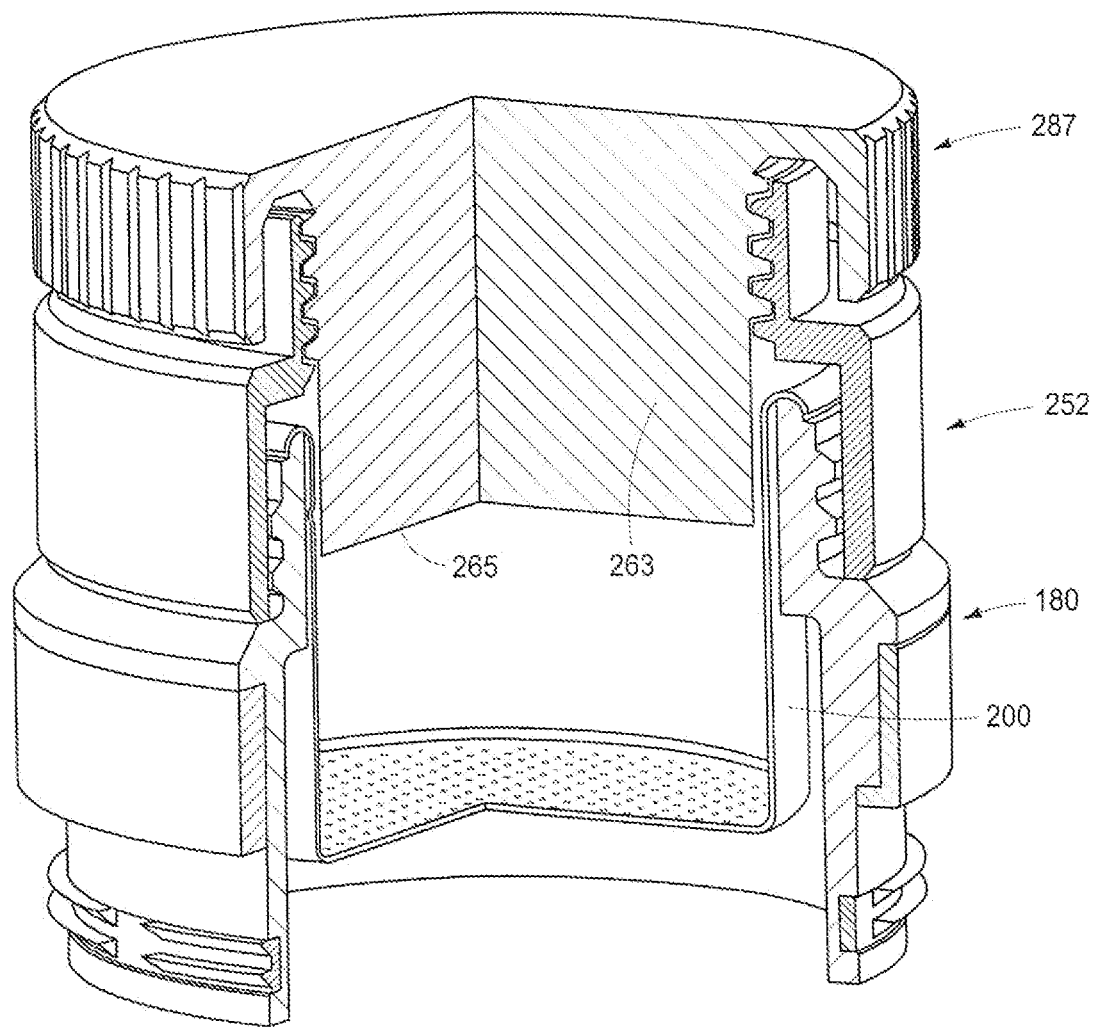
FIG. 8 is a perspective, partial cutaway, view of the tamper Interconnected with the porta filter frame of FIG. 7.
Figure 9:
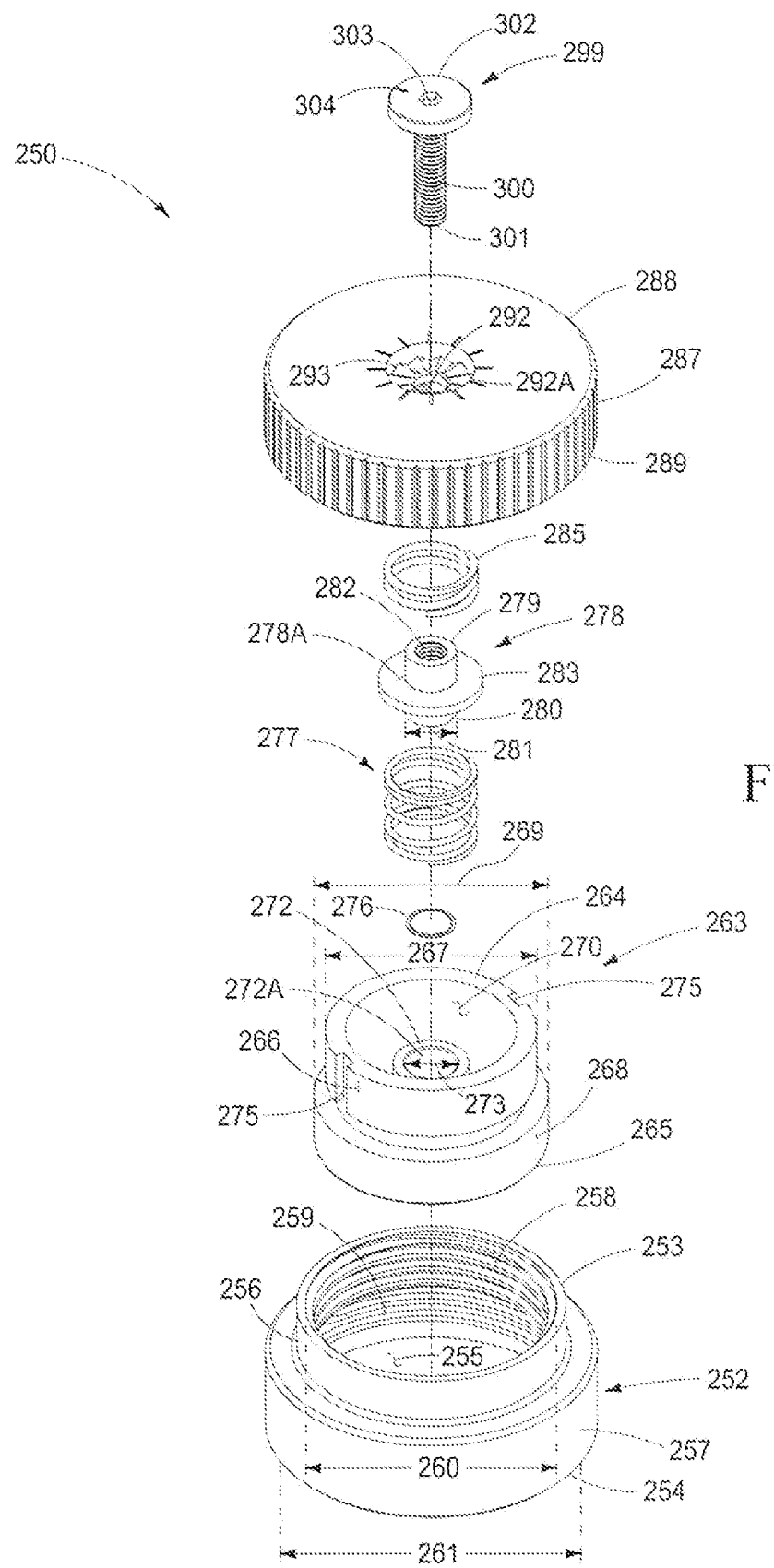
FIG. 9 is an exploded view of a second embodiment of an adjustable tamper, showing the components thereof.
Figure 10:
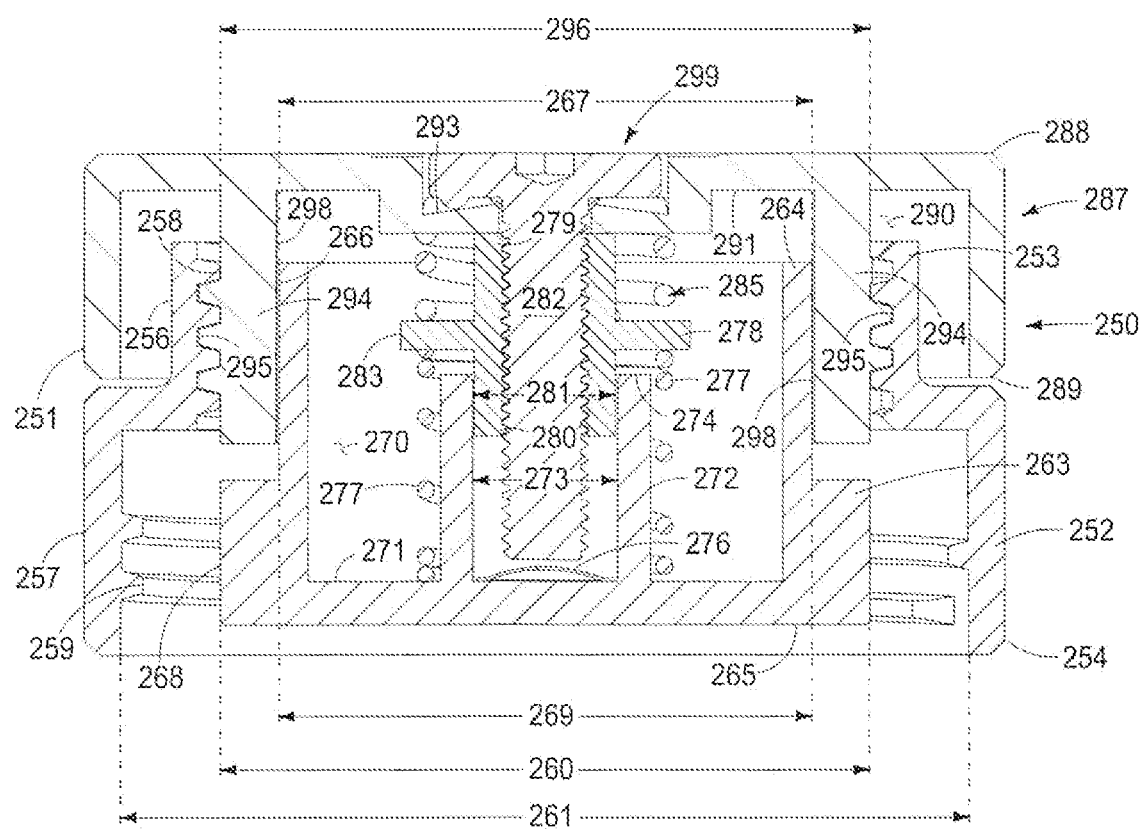
FIG. 10 is an orthographic cross-section view of the adjustable tamper of FIG. 9 in an assembled state.

Best shown in FIGS. 8-10, the tamper collar 252 has a first end portion 253, a second end portion 254 and defines a medial channel 255 that extends between the first end portion 253 and the second end portion 254. The first end portion 253 has a first outer circumferential surface 256 that defines first interior threads 258 and a first interior diameter 260. The second end portion 254 has a second outer circumferential surface 257 defining second interior threads 259 and defining a second interior diameter 261 that is greater than the first interior diameter 260.

The tamper base 263 is adjustably positionally carried within the medial channel 255 of the tamper collar 252. The tamper base 263 has a first end portion 264 and a second end portion 265 and defines a medial chamber 270 that has an interior bottom surface 271 with a medial hollow cylinder 272 extending axially upwardly therefrom. The first end portion 264 of the tamper base 263 has a first outer circumferential surface 266 and a first diameter 267. The second end portion 265 of the tamper base 263 has a second outer circumferential surface 268 and a second outer diameter 269, and the medial hollow axially extending cylinder 272 defines a blind medial axial channel 272A that defines an interior diameter 273.

The spring button 276 is generally disk-like in configuration and is convexly domed in a direction opposite the second end portion 265 of the tamper base 263. The convex dome portion of the spring button 276 is resiliently deformable, and when axially deformed downwardly emanates an audible "click". The spring button 276 has a diameter (not shown) that allows the spring button 276 to be carried within the medial hollow cylinder 272, and at the blind bottom end portion (not shown) thereof. (See FIG. 10).

A preload spring 277 is a coil spring and has a predetermined compression strength and is axially carried on the medial hollow cylinder 272, on an exterior surface thereof, and the preload spring 277 extends axially from the inner bottom surface of the medial chamber 270. (See FIG. 10).

The preload plate 278 engages simultaneously with the preload spring 277, the medial axial channel 272A defined by the medial cylinder 272 and the spring button 276. The preload plate 278 has a first end portion 279, a second end portion 280, and a radially enlarged medial shoulder 283 on an outer circumferential surface 278A between the first end portion 279 and the second end portion 280. The second end portion 280 defines a diameter 281 that allows axial engagement within the medial channel 272A of the medial cylinder 272. The preload plate 278 further defines a threaded medial axial channel 282.

A retention spring 285 is a coil spring and has a predetermined compression strength and is carried on the preload plate 278, and frictionally communicates with the radially enlarged shoulder 283 thereof, opposite the tamper base 263.

The tamper grip 287 has a first axial end portion 288 and a second end portion 289 that defines an opening to a medial chamber 290 that is defined by an interior axial surface 291. Best shown in FIG. 10, the tamper grip 287 has an internal axially extending sleeve 294 that defines threads 295 on an exterior surface for threadable engagement with the first interior threads 258 of the tamper collar 252. An opposing interior surface 288 of the sleeve 294 slidably axially engages with the first outer circumferential surface 266 of the tamper base 263. A medial axial hole 292 is defined in the first axial end portion 288 and communicates with the medial chamber 290. The medial axial hole 292 has an exterior countersunk shoulder 292A that carries a plurality of spacedly arrayed detents 293. As shown in FIG. 10, the tamper grip 287 simultaneously engages with the retention spring 285, the preload plate 278, the tamper base 263 and the tamper collar 252 so that the tamper base 263 is axially positionally movable within the medial chamber 290.

The preload screw 299 is elongate and extends through the medial axial hole 292 of the tamper grip 287 and engages in the threaded medial axial channel 282 defined in the preload plate 278. The preload screw 299 has a threaded shaft 300 with a terminal end, and a radially enlarged head 302 opposite the terminal end 301. The radially enlarged head 302 defines a tool engaging feature 303 on a surface opposite the threaded shaft 300, and the radially enlarged head 302 defines an alignment indicator 304 to cooperate with the plurality of spacedly arrayed detents 293 defined in the tamper grip 287 two provide predetermined information to a user.

Figure 7:
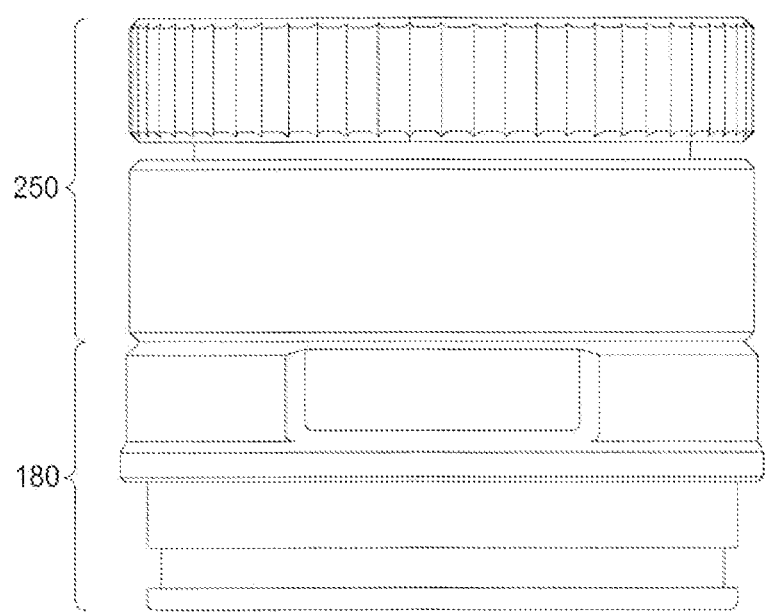
FIG. 7 is an orthographic side view of a first embodiment of a tamper engaged with the porta filter frame to compress particulates contained within the porta filter particulate basket.

As shown in FIG. 7, the tamper 250 is releasably engageable with the porta filter frame 180, to compress/compact particulate, such as, but not limited to, ground coffee within the removable particulate basket 200, to a predetermined compaction/pressure so as to allow a user to determine and generate a desired texture, aroma and flavor of the infused fluid.

Other configurations of tamper 250 are also contemplated and may be releasably engageable with the porta filter frame 182 compact the particulate in the particulate basket 200. Such other configurations may comprise at least two diametrically opposed to logs on the tamper body 251 that releasably engage with mating connections of the porta filter frame 180. Set engagement has both a rotational and axial component such that the rotational engagement of the tamper 250 body 251 with the porta filter frame 180 causes an interior portion of the tamper 250 to move axially (downwardly) within the porta filter frame 180 and into the medial particulate cavity 205 of the particulate basket 202 compact the particulate therein.

The accompanying drawings (FIGS. 7-11) show the tamper 250 threadably engageable with the particulate basket 200, but such a threadable interconnection is not mandatory. In some contemplated embodiments, the engagement may be, without limitation, axially slidable. Further still, as shown in FIG. 8, the tamper 250 may be of a non-adjustable type, having a stationary and somewhat unitary tamper base 263 fixedly interconnected to the interior bottom surface 291 of the tamper collar 287. In such an additional embodiment axial downward compressive force is exerted upon the particulate contained within the particulate cavity 205 of the particulate basket 200 by axial rotation of the tamper 250 relative to the portafilter frame 180.

Operation

Having described the structure of our apparatus for infusing a liquid, its operation is briefly described.

Presuming the porta filter frame 180 is threadably interconnected to the second end portion 162 of the pressure cylinder 160, the porta filter frame 180 is detached from the pressure cylinder 160 by axially rotating the porta filter frame 180, in a counterclockwise direction, relative to the pressure cylinder 160 so that the porta filter frame 180 is detached therefrom and the removable particulate basket 200 carried by the porta filter frame 180 is accessible.

A volume of particulate (not shown), such as, but not limited to coffee, is placed within the cavity 205 defined in the removable particulate basket 200.

The user determines the desired amount of compaction desired for the infused liquid, and adjusts the position of the preload screw 299 on the first end portion 288 of the tamper grip 187 so that the alignment indicator 304 is properly aligned with the desired spacedly arrayed detents 293 defined in the medial axial hole 292 of the tamper grip 287. The predetermined alignment thereof sets the amount of compression to be exerted by the tamper base 263 upon the particulate (not shown) when the tamper 250 is engaged with the porta filter frame 180.

The tamper 250 is positioned so that the tamper base 263 is axially aligned with the cavity 205 defined in the removable particulate basket 200. The tamper 250 is engaged with the porta filter frame 180, and rotated clockwise relative thereto so that the threads 259 defined in the tamper caller 252 threadably engage with the threads 189 defined in the first end portion 181 of the porta filter frame 180. The tamper 250 is rotated axially in a clockwise direction which responsively axially drives the tamper base 263 into the cavity 205 to compress the particulate therein. The terminal end portion 300 one of the preset screw 299 frictionally contacts the dome button 276 and responsively causes the convex portion of the dome button to move downwardly axially which responsively generates an audible "click". Once the compression/compaction is completed, (the "click" has occurred) the tamper 250 is disengaged from the porta filter frame 180 by rotating the tamper 250 axially in a counterclockwise direction relative to the porta filter frame 180.

The porta filter frame 180 is threadably connected to the second end portion 162 of the pressure cylinder 160 by axially aligning the respective components, and thereafter axially rotating the porta filter frame 180, in a clockwise direction, relative to the pressure cylinder 160.

The carafe 220 is releasably interconnected to the second end portion 182 of the porta filter frame 180.

The handcrank 140 is positioned, relative to the socket 141 so that the handgrip 150 is accessible and rotatable relative to the body 10. The handcrank 140 is secured in such operating position with the threaded set screw 153. The handcrank 140 is rotated in a counterclockwise direction, relative to the socket 141 so that the lead screw 60, the valve body 85 and the plunger 70 are axially moved within the pressure cylinder 160 medial channel 164 toward the gearbox 20. Once the valve body 85 and plunger 70 are at a position, within the medial channel 164, proximate the gearbox 20, a predetermined volume of liquid, including, but not limited to hot water, is poured into the recessed fluid receiving depression 27 defined in the axially aligned end portion 21A of the gearbox 20. The liquid poured therein passes through the fluid to drain 28 and the medial channel 32 defined in the gearbox 20 and responsively passes into the medial channel 164 of the pressure cylinder 160 and into a position above the plunger 70. The liquid then passes through the gap 101 defined between the plunger 70 and the second end portion 87 of the valve body 85 due to the positional biasing of the plunger 70 relative to the valve body 85 by the spider ring spring 120.

Liquid may be poured into the pressure cylinder 160 either before, or after the handcrank 140 is rotated to axially move the valve body 85 to a position proximate the first end portion 161 of the pressure cylinder 160. The gap 101 between the valve body 85 and the plunger 70 generally remains open until the valve body 85 is moved downwardly which responsively overcomes any biasing provided by the spider ring spring 120.

After the desired volume of liquid has been poured into the body 10, the handcrank 140 is rotated in a clockwise direction, relative to axial rotation of the socket 141. Rotation of the handcrank 140 responsively causes the worm gear 45 to rotate axially, and the rotation of the worm gear 45 is threadably communicated to the lead screw nut 105 which responsively causes the lead screw nut 105 to rotate axially in a direction perpendicular to the axial rotation of the worm gear 45. The axial rotation of the lead screw nut 105 responsively causes the lead screw 60 to move axially, and without axial rotation, within the medial channel 164 of the pressure cylinder 160. The downward axial movement of the valve body 185 relative to the plunger 70 causes biasing of the spider ring spring 120 to be overcome which causes the valve body 85 to sealingly engage with the plunger 70 and fluidically seal the medial axial channel 82 defined in the plunger 70 so that the liquid within the medial channel 164 of the pressure cylinder 160 cannot pass upwardly through the plunger 70 and through the now sealed gap 101. The continuous downward axial movement of the valve body 85 and plunger 70 forces the liquid within the medial channel 164, and vertically below the plunger 70 to pass, under substantial pressure, through the compressed/compacted particulate in the particulate basket 200. Passage of the liquid through the compressed/compacted particulate extracts the soluble components from the particulate, and the extracted soluble components, now carried within the liquid, pass through the removable particulate basket 200 through the plurality of spacedly arrayed holes 200 for defined therein. Any excess steam may pass through/be released through the flexible vented gasket 192.

The liquid, carrying the soluble components is collected within the fluid receiving cavity 225 of the carafe 200. For consumption, the user may disconnect to the carafe 220 from the second end portion 182 of the porta filter frame 180 so that the contents of the fluid receiving cavity 225 may be consumed or moved to a different location.

A principal object of the present invention is to provide an apparatus for infusing a liquid, the apparatus comprising: a body 10 having a first end portion 11, and a second end portion 12 and an outer circumferential surface 14; a gear box 20 at the first end portion 11 of the body 10, the gear box 20 having a first end portion 21 that defines a liquid receiving depression 27, a second end portion 22, and a liquid channel 32 that communicates between the liquid receiving depression 27 and the second end portion 22 for liquid to pass there-through, the gear box 20 further defining an axially aligned lead screw channel 38 that carries an axially movable lead screw 60 therein; and the lead screw 60 has opposing first 61 and second 62 end portions, defines threads 65 in an outer circumferential surface 64, and defines an axially aligned key-way 66 that engages with a lead screw key 39 carried by the gear box 20 to prevent the lead screw 60 from rotating axially relative to the gear box 20, and the lead screw 60 threadably communicates with a lead screw nut 105 that is carried in a lead screw nut cavity 51 defined in the gear box 20; and the lead screw nut 105 defines worm gear threads 109 in an outer circumferential surface 108, and defines an axial channel 110, and threads 113 defined in an inner circumferential surface of the lead screw nut 105 axial channel 110 operatively engage with the threads 65 defined in the lead screw 60; and the lead screw nut cavity 51 defined in the gear box 20 communicates with a generally transversely extending worm gear channel 37 defined in the gear box 20, so that the worm gear threads 109 defined in the lead screw nut 105 operatively engage with worm gear threads 56 defined in a worm gear 45 carried in the worm gear channel 37; and a hand crank 140 is interconnected with the worm gear 45 so that rotation of the hand crank 140 is mechanically communicated to the lead screw 60 to axially move the lead screw 60, relative to the gear box 20, and without axial rotation, in a first direction, and in a second direction; and a valve body 85 is carried at the second end portion 62 of the lead screw 60, the valve body 85 defining a pressure relief channel 91, and carrying a spider ring spring 120 that biases a position of the valve body 85 relative to a plunger 70; and the plunger 70 is generally annular in configuration and defines a medial axial channel 82, and the spider ring spring 120 biases the plunger 70 in a direction away from engagement with the valve body 85 so that a gap 101 is defined between the valve body 85 and the plunger 70 so that liquid may flow therebetween from a position in a pressure cylinder 160 above the plunger 70 to a position in the pressure cylinder 160 below the plunger 70 when the plunger 70 is in a first position and when the plunger 70 is in a second position, the biasing of the spider ring spring 124 is over, responsive to axial downward movement of the valve body 85 toward the second end portion 12 of the body 10, and the gap 101 is closed, and the valve body 85 is sealingly engaged with the plunger 70 so that fluid/liquid cannot pass/flow therebetween; and the pressure cylinder 160 is elongate, and cylindrical, and has a first end portion 161 that is threadably interconnected with the second end portion 22 of the gear box 20, and the pressure cylinder 160 defines a medial channel 164 that extends between the first end portion 161 and a second end portion 162, the medial channel 164 having an inner diameter 168 that is substantially the same as a diameter 81 of the plunger 70 so that a fluid tight seal is maintained therebetween as the plunger 70 moves axially within the pressure cylinder 160 medial channel 164 responsive to rotation of the hand crank 140 and axial movement of the lead screw 60, the pressure cylinder 160 further defining threads at a second end portion to provide a releasable interconnection with a portafilter frame 180; and the portafilter frame 180 is threadably interconnected to the second end portion 162 of the pressure cylinder 160, the portafilter frame 180 defining a medial channel 185 and carrying a removable particulate basket 200 within the medial channel 185, the removable particulate basket defining a particulate cavity 205 and a plurality of spacedly arrayed holes 204 are defined within the particulate cavity 205 for passage of infused liquid there-through, and into a carafe 220; and the carafe 220 is releasably interconnected to the portafilter frame 180 opposite the pressure cylinder 160 and the carafe 220 defines a fluid receiving cavity 225 to collect the infused liquid passing through the removable particulate basket 200.

A further object of the present invention is to provide an apparatus for infusing a liquid wherein the pressure cylinder has an inner wall 175 and an outer wall 176 with a thermally insulating void between the inner wall 175 and the outer wall 176.

A further object of the present invention is to provide an apparatus for infusing a liquid wherein the spider ring spring 120 has a spider ring hub 121 that defines a medial channel 122 through which the second end portion 62 of the lead screw 60 extends; a valve body engaging edge portion 123 adjacent the spider ring hub 121; and plural spacedly arrayed spider ring arms 124 that each extend generally radially outwardly from the spider ring hub 121, each of the plural spacedly arrayed spider ring arms 124 having a first outer arm portion 126, and a second inner arm portion 127, and each first outer arm portion 126 terminates at a terminal end portion 125 that communicates with the plunger 70; and the spider ring spring 120 movably interconnects the valve body 85 and the plunger 70.

A further object of the present invention is to provide an apparatus for infusing a liquid wherein the worm gear 45 is barrel-like in configuration and has a first end portion 46, a second end portion 47, and a socket pinion 50 extends axially from the second end portion 47; and the worm gear 45 is carried on rotation bushings within the transversely extending worm gear channel 37 defined in the gear box 20.

A further object of the present invention is to provide an apparatus for infusing a liquid wherein the plunger 70 defines a diameter 81 and has an outer circumferential edge 73, that defines a seal channel 74, that carries an O-ring 75 therein; and an inwardly downwardly tapering depression 76 defined in an upper surface of the plunger 70 defines an annular fluid seal groove 77 which carries a seal 78 therein to provide a fluid tight seal between the plunger 70 and a plunger engaging flange 89 proximate the valve body 85; and the plunger 70 defines plural spacedly arrayed spider arm latches 80 in the outer circumferential edge 73, and each of the spacedly arrayed spider arm latches 80 is configured to engage with a terminal end portion 125 of the plural spacedly arrayed spider arms 124 of the spider ring spring 120.

A further object of the present invention is to provide an apparatus for infusing a liquid and further comprising: a flexible vented gasket 192 between the carafe 220 and the portafilter frame 180 to allow escape/release of pressurized vapor therethrough.

A further object of the present invention is to provide an apparatus for infusing a liquid wherein the carafe 220 is cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 defines threads 229 that engage with threads 191 defined in the second end portion 182 of the portafilter frame 180, the carafe 220 further defining gripping features to promote gripping by a user for detachment from, and attachment to, the portafilter frame 180, and attachment to, and detachment from, a tamper 250.

A further object of the present invention is to provide an apparatus for infusing a liquid wherein the gear box 20 has an outer circumferential surface 23, a first end portion 21 that has an upper surface 21A that defines a recessed liquid receiving depression 27; and a second end portion 22 that has a lower surface 22A; and a radially reduced medial portion 26 between the first end portion 21 and the second end portion 22; and a liquid drain 28 is defined within the liquid receiving depression 27, the liquid drain 28 defining the liquid channel 32 that communicates between the recessed liquid receiving depression 27 and the lower surface 22A for liquid to pass there-through; and the gear box 20 further defining the axially aligned lead screw channel 38 that extends between the upper and lower surfaces 21A, 22A, and the lead screw channel 38 carries a radially inwardly extending lead screw key 39 that slidably engages with the keyway 66 defined in the axially movable lead screw 60 carried within the lead screw channel 38.

A further object of the present invention is to provide an apparatus for infusing a liquid wherein the lead screw 60, and the lead screw nut 105, and the worm gear 45 all rotate relative to one another responsive to rotation of the hand crank 140; and the lead screw nut cavity 51 defined in the gear box 20 communicates with a transversely extending worm gear channel 37 defined in the gear box 20, so that the worm gear threads 109 defined in the lead screw nut 105 operatively engage with the worm gear threads 56 defined in a worm gear 45 carried in the generally transversely extending worm gear channel 37.

A further object of the present invention is to provide an apparatus for infusing a liquid and wherein the hand crank 140 is positionally adjustable and extends proximate the outer circumferential surface 14 of the body 10; and the hand crank 140 has a socket 141 that has a first end portion 142 and a second end portion 143, and the first end portion 142 of the socket 141 is engaged with an axially extending socket pinion 50 carried by the worm gear 45; and the second end portion 143 of the socket 141 defines a diametrically extending through hole 144 to adjustably positionally engage with an elongate second arm 146 of the hand crank 140; and the socket 141 also defines an axially aligned hole 145 in the second end portion 143 for a threaded set screw 153 to adjustably secure the elongate second arm 146 to the socket 141; and the elongate second arm 146 has a first end portion 147 and a second end portion 148 that defines plural spacedly arrayed bends 149, and the first end portion 147 of the elongate second arm 146 defines a first 151 and a second 152 diametrically extending through hole for the threaded set screw 153, and the first hole 151 is aligned axially perpendicular relative to the second hole 152; and the second end portion 148 of the elongate second arm 146 carries a hand grip 150 at a terminal end thereof; and the elongate second arm 146 is positionally adjustable relative to the socket 141 by predetermined alignment of the first and second through holes 151, 152 relative to the axially aligned hole 145 defined in the socket 141 and engagement of the threaded set screw 153 therein; and rotation of the hand crank 140 responsively axially rotates the worm gear 45, and the axial rotational motion of the worm gear 45 is threadably communicated to the lead screw nut 105 which responsively communicates the rotational motion to the lead screw 60, which responsively causes the lead screw 60 to move axially, and without rotation, in a first direction, and in a second direction; and the rotation of the hand crank 140 and the axial rotation of the worm gear 45 is in a direction that is perpendicular to the axial movement of the lead screw 60.

A further object of the present invention is to provide an apparatus for infusing a liquid wherein the valve body 85 is carried at the second end portion 62 of the lead screw 60, and the valve body 85 has an outwardly downwardly tapered first end portion 86, a medial portion 88, an inwardly downwardly tapered second end portion 87; and a plunger engaging flange 89, at the inwardly downwardly tapered second end portion 87; and a pressure relief channel 91 defined in the valve body 85 communicates between the inwardly downwardly tapered second end portion 87 which defines a pressure relief entrance orifice 93 and the medial portion 88 of the valve body 85 which defines a pressure relief exit orifice 92; and the pressure relief channel 91 defines an interior surface 95 at the pressure relief entrance 93; and a ball bearing seal 96 is carried within the pressure relief channel 91, the ball bearing seal 96 having a diameter 97 that frictionally communicates with interior surfaces 95 of the pressure relief entrance orifice 93 to provide a fluid tight seal therebetween; and the ball bearing seal 96 is positionally maintained in direct frictional contact with the interior surface 95 by a biasing spring 98 that has a predetermined compression strength of between approximately 10 bar (approximately 145 psi) and approximately 11 bar (approximately 160 psi).

A further object of the present invention is to provide an apparatus for infusing a liquid and wherein the plunger 70 is generally annular in configuration and has a first surface 71 proximate the valve body 85 that defines and inwardly downwardly tapered depression 76, and a second surface 72 opposite the valve body 85, and defines a medial axial channel 82 that operatively communicates with the valve body 85, and the plunger 70 has a diameter 81 with an outer circumferential edge 73, the outer circumferential edge 73 defining an O-ring channel 74, that carries an O-ring 75 therein; and the inwardly downwardly tapering depression 76 defines an annular fluid seal groove 77 which carries a seal 78 therein to provide a fluid tight seal between the plunger 70 and the valve body 85, and the plunger 70 defines plural spacedly arrayed spider arm latches 80 in the outer circumferential edge 73, each of the spacedly arrayed spider arm latches 80 configured to engage a terminal end portion 125 of plural spacedly arrayed spider arms 124 of the spider ring spring 120, and wherein an angle 131 between the first outer arm 126 and the second inner arm 127 of the spider ring spring 120 biases the plunger 70 in a direction away from engagement with the valve body 85 so that a gap 101 is defined between the valve body 85 and the inwardly tapered depression 76 defined in the first upper surface 71 of the plunger 70 so that liquid may flow therebetween from a position in the body 10 above the plunger 70 to a position in a pressure cylinder 160 below the plunger 70.

A further object of the present invention is to provide an apparatus for infusing a liquid wherein the pressure cylinder 160 is preferably formed of stainless steel, is elongate and cylindrical and has an inner wall 175 and an outer wall 176 with a thermally insulating void 177 therebetween; and the outer wall 176 has an outer circumferential surface 165; and the inner wall 175 has an inner circumferential surface 167; and the pressure cylinder 160 is threaded at a first end portion 161 and is threaded at a second end portion 162; and the pressure cylinder 160 first end portion 161 is threadably interconnected with the second end portion 22 of the gear box 20; and the pressure cylinder 160 defines a medial channel 164 that is defined by the inner circumferential surface 167 of the inner wall 175 and the medial channel 164 extends between the first end portion 161 and the second end portion 162; and the medial channel 164 has an inner diameter 168 that is substantially the same as the plunger diameter 81 so that a fluid tight seal is maintained between the inner circumferential surface 167 and the O-ring 75 carried in the O-ring channel 74 defined in the outer circumferential edge 73 of the plunger 70, as the plunger 70 moves axially within the medial channel 164 of the pressure cylinder 160 responsive to rotation of the hand crank 140 and axial movement of the lead screw 60, the pressure cylinder 160 medial channel 164 further having an inner radially enlarged shoulder 171 at the second end portion 162, the radially enlarged portion 171 defining threads 172 on an inner circumferential surface thereof, and the radially enlarged shoulder 171 defining a seal groove 173 carrying a seal 174 therein to provide a fluid tight threaded interconnection between the pressure cylinder 160 and the portafilter frame 180.

A further object of the present invention is to provide an apparatus for infusing a liquid wherein the portafilter frame 180 is threadably interconnected to the second end portion 162 of the pressure cylinder 160, the portafilter frame 180 having a first end portion 181, a medial portion 183, and a second end portion 182 and defines a medial channel 185 that has a diameter 186, and an inner circumferential surface 187, the portafilter frame 180 further has a radially reduced exterior shoulder 188 at the first end portion 181 with threads 189 defined in the radially reduced shoulder 188;

and the portafilter frame 180 has a radially reduced exterior shoulder 190 at the second end portion 182 that defines threads 191; and the portafilter frame 180 carries a removable particulate basket 200 within the medial channel 185, the removable particulate basket having an upper end portion 201 with a radially enlarged securement lip 202 that carries a fluid seal (not shown) thereon; and the removable particulate basket 200 defines a medial particulate cavity 205 and a plurality of spacedly arrayed holes 204 are defined within the removable particulate basket 200 for passage of infused liquid there-through and into a carafe 220.

A further object of the present invention is to provide an apparatus for infusing a liquid wherein the carafe 220 is threadably interconnected to the radially reduced exterior shoulder 190 at the second end portion 182 of the portafilter frame 180 and the carafe 220 collects the infused fluid (not shown) passing through the removable particulate basket 200; and a flexible vented gasket 192 is carried between the carafe 220 and the portafilter frame 180 to allow escape of pressurized vapor; and the fluid carafe 220 is cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 defines threads 229 that engage with the threads 191 of the portafilter frame 180, the carafe 220 further defining gripping recesses 230 in the exterior circumferential surface 224 to promote gripping by a user for detachment from, and attachment to, the portafilter frame 180.

A further object of the present invention is to provide an apparatus for infusing a liquid wherein the gearbox 20 provides a gear ratio between rotation of the hand crank 140 and axial movement of the lead screw 60 of approximately 1 revolution to 1.6 mm of movement.

A further object of the present invention is to provide an apparatus for infusing a liquid wherein the gearbox 20 provides a gear ratio between rotation of the hand crank 140 and axial movement of the lead screw 60 so as to generate pressure within the pressure cylinder 160 and below the plunger 70 of approximately 130 psi.

A further object of the present invention is to provide an apparatus for making espresso, the apparatus comprising: a body 10 having a first end portion 11, a medial portion 13, and a second end portion 12, the body 10 having a diameter 15 and an outer circumferential surface 14 that defines gripping features; a gear box 20 at the first end portion 11 of the body 10, the gear box 20 having an outer circumferential surface 23, a first end portion 21 that has an axially aligned upper surface 21A that defines a concavely shaped liquid receiving depression 27, and a second end portion 22 that has an axially aligned lower surface 22A, and a radially reduced medial portion 26 between the first end portion 21 and the second end portion 22, and a liquid drain 28 is defined within the concavely shaped liquid receiving depression 27, the liquid drain 28 defining a liquid channel 32 that communicates between the concavely shaped liquid receiving depression 27 and the axially aligned lower surface 22A for liquid to pass there-through, the gear box 20 further defining an axially aligned lead screw channel 38 that extends between the upper and lower axially aligned surfaces 21A, 22A, the lead screw channel 38 having a radially inwardly extending lead screw lug 39 that slidably engages with a keyway 66 defined in an axially movable lead screw 60 that is carried within the lead screw channel 38; and the lead screw 60 is elongate and has a first end portion 61 and a second end portion 62, defines threads 65 in an outer circumferential surface 64, and defines an axially aligned anti-rotation key-way 66 that extends between the first end portion 61 and the second end portion 62, the key-way 66 slidably engages with the lead screw key 39 to prevent the lead screw 60 from rotating axially, and the lead screw 60 is carried within and extends axially though the lead screw channel 38 and extends axially outwardly from both the first end portion 21 and the second end portion 22 of the gear box 20, and the lead screw 60 threadably communicates with a lead screw nut 105 that is rotatably carried on rotation bushings 52 in a lead screw nut cavity 51 defined in the gear box 20; and the lead screw nut 105 defines a medial axial channel 110 through which the lead screw 60 axially extends, and threads 113 defined in an inner circumferential surface of a medial axial channel 110 operatively engage with the threads 65 defined in the outer circumferential surface 64 of the lead screw 60 so that the lead screw 60 and the lead screw nut 105 move relative to one another responsive to axial rotation of the lead screw nut 105, and the lead screw nut 105 further defines worm gear threads 109 in an outer circumferential surface 108, and the lead screw nut cavity 51 communicates with a transversely extending worm gear channel 37 defined in the gearbox 20, so that the worm gear threads 109 defined in the lead screw nut 105 operatively engage with worm gear threads 56 defined in a worm gear 45 carried in the transversely extending worm gear channel 37 defined in the gear box 20; and the worm gear 45 is barrel shaped in configuration and has a first end portion 46 and a second end portion 47 and a socket pinion 50 extends axially from the second end portion 47 and the worm gear 45 defines worm gear threads 56 in an outer circumferential surface that operatively threadably communicate with the worm gear threads 109 defined in the lead screw nut 105 so that rotational motion is threadably communicated therebetween; a positionally adjustable hand crank 140 that extends proximate the outer circumferential surface 14 of the body 10, is interconnected with the axially extending socket pinion 50, the hand crank 140 having a socket 141 that has a first end portion 142 and a second end portion 143, and the first end portion 142 is engaged with the axially extending socket pinion 50, and the second end portion 143 defines a diametrically extending through hole 144 to adjustably positionally engage with an elongate second arm 146, and an axially aligned hole 145 for a threaded set screw 153, the elongate second arm 146 has a first end portion 147 and a second end portion 148 that defines plural spacedly arrayed bends 149, and the first end portion 147 defines a first 151 and a second 152 diametrically extending through hole for the threaded set screw 153, and the first hole 151 is aligned axially perpendicular relative to the second hole 152, and the second end portion 148 of the elongate second arm 146 carries a hand grip 150 at a terminal end thereof, and the elongate second arm 146 is positionally adjustable relative to the socket 141 by predetermined alignment of the first and second through holes 151, 152 relative to the axially aligned hole 145 of the socket 41 and engagement of the threaded set screw 153 therein so that rotation of the hand crank 140 responsively axially rotates the worm gear 45, and the axial rotational motion of the worm gear 45 is threadably communicated to the lead screw nut 105 which responsively communicates the rotational motion to the lead screw 60, which responsively causes the lead screw 60 to move axially, and without rotation, in a first direction, and in a second direction, responsive to the rotation of the hand crank 140, and the rotation of the hand crank 140 and axial rotation of the worm gear 45 is in a direction that is perpendicular to the axial movement of the lead screw 60; and the lead screw 60 carries, at its second end portion 62, a valve body 85, the valve body 85 having an outwardly downwardly tapered first end portion 86, a medial portion 88, an inwardly downwardly tapered second end portion 87 with a plunger engaging flange 89 at the second end portion 87, a pressure relief channel 91 defined in the valve body 85 communicates between the second end portion 87 which defines a pressure relief entrance orifice 93 and the medial portion 88 which defines a pressure relief exit orifice 92, the pressure relief channel 91 defines an interior surface 95 at the pressure relief entrance 93, and a ball bearing seal 96 is carried within the pressure relief channel 91, the ball bearing seal 96 having a diameter 97 that frictionally communicates with interior surfaces 95 of the pressure relief entrance orifice 93 to provide a fluid tight seal therebetween, and the ball bearing seal 96 is positionally maintained in frictional communication with the interior surface 95 by a biasing spring 98 that has a predetermined compression strength of approximately between approximately 10 bar (approximately 145 psi) and approximately 11 bar (approximately 160 psi), and the valve body 85, at the first end portion 86, carries a spider ring spring 120; and the spider ring spring 120 has a spider ring hub 121 that defines a medial channel 122 through which the second end portion 62 of the lead screw 60 extends, the spider ring spring 120 further having a valve body engaging edge portion 123 and plural spacedly arrayed spider ring arms 124, each of the plural spacedly arrayed spider ring arms 124 having a second inner arm portion 127, and a first outer arm portion 126, and each first outer arm portion 126 terminates at an end portion 125 that communicates with a plunger 70, and the spider ring spring 120 movably interconnects the valve body 85 and the plunger 70; and the plunger 70 is generally annular in configuration and has a first upper surface 71 proximate the valve body 85 that defines and inwardly downwardly tapered depression 76, and has a second lower surface 72 opposite the valve body 85, and the plunger 70 defines a medial axial channel 82 that operatively communicates with the second end portion 87 of the valve body 85, and the plunger 70 has a diameter 81 with an outer circumferential edge 73, the outer circumferential edge 73 defining an O-ring channel 74, that carries an O-ring 75 therein, and the inwardly downwardly tapering depression 76 of the plunger 70 defines an annular fluid seal groove 77 which carries a seal 78 therein to provide a fluid tight seal between the plunger 70 and the plunger engaging flange 89 of the valve body 85, and the plunger 70 defines plural spacedly arrayed spider arm latches 80 in the outer circumferential edge 73, each of the spacedly arrayed spider arm latches 80 configured to engage with a terminal end portion 125 of one of the plural spacedly arrayed spider arms 124 of the spider ring spring 120, and wherein an angle 131 between the first outer arm 126 and the second inner arm 127 of the spider ring spring 120 biases the plunger 70 in a direction away from engagement with the valve body 85 so that a gap 101 is defined between the valve body 85 and the inwardly tapered depression 76 defined in the first upper surface 71 of the plunger 70 so that liquid may flow therebetween from a position in the body 10 above the plunger 70 to a position in a medial channel 164 of pressure cylinder 160 vertically below the plunger 70; and the pressure cylinder 160 is preferably formed of stainless steel, is elongate and cylindrical and has an inner wall 175 and an outer wall 176 with a thermally insulating void 177 therebetween, the outer wall 176 has an outer circumferential surface 165, and the inner wall 175 has an inner circumferential surface 167, the pressure cylinder 160 is externally threaded at the first end portion 161 and is internally threaded at the second end portion 162, the pressure cylinder 160 first end portion 161 is threadably interconnected with the second lower end portion 22 of the gear box 20, and the pressure cylinder 160 defines a medial channel 164 that is defined by the inner circumferential surface 167 of the inner wall 175 and the medial channel 164 extends between the first end portion 161 and the second end portion 162, the medial channel 164 having an inner diameter 168 that is substantially the same as the plunger diameter 81 so that a fluid tight seal is maintained between the inner circumferential surface 167 and the O-ring 75 carried in the O-ring channel 74 defined in the outer circumferential edge 73 of the plunger 70, as the plunger 70 moves axially within the medial channel 164 of the pressure cylinder 160 responsive to rotation of the hand crank 140 and axial movement of the lead screw 60, the pressure cylinder 160 further having a radially reduced shoulder 169 at the first end portion 161 with the threads 170 defined in the radially reduced shoulder 169, and having a radially enlarged inner shoulder 171 at the second end portion 162, the radially enlarged inner shoulder 171 defining threads 172 on an inner circumferential surface thereof, and the radially enlarged inner shoulder 171 defining a seal groove 173 carrying a seal 174 therein to provide a fluid tight threaded interconnection between the pressure cylinder 160 and a portafilter frame 180; and the portafilter frame 180 is threadably interconnected to the second end portion 162 of the pressure cylinder 160, the portafilter frame 180 having a first end portion 181, a medial portion 183, and a second end portion 182 and defines a medial channel 185 that has a diameter 186, and has an exterior circumferential surface 184 and an opposing interior circumferential surface 187, the portafilter frame 180 further has a radially reduced shoulder 188 at the first end portion 181 with threads 189 defined in the radially reduced shoulder 188, and the portafilter frame 180 has a radially reduced shoulder 190 at the second end portion 182 that defines threads 191, the portafilter frame 180 carries a removable particulate basket 200 within the medial channel 185, the removable particulate basket having an upper end portion 201 with a radially enlarged securement lip 202 that carries a fluid seal (not shown) thereon, the removable particulate basket 200 defining a medial particulate cavity 205 and a plurality of spacedly arrayed holes 204 are defined within the removable particulate basket 200 for passage of infused liquid therethrough and into a carafe 220; and the carafe 220 is threadably interconnected to the radially reduced shoulder 190 at the second end portion 182 of the portafilter frame 180 and the carafe 220 collects the infused fluid passing through the removable particulate basket 200, a flexible vented gasket 192 is carried between the carafe 220 and the portafilter frame 180 to allow escape of pressurized vapor, the fluid carafe 220 is generally cup-like in configuration and has a first end portion 221, a medial portion 223, a second end portion 222, an exterior circumferential surface 224 and defines a liquid receiving cavity 225 between the first end portion 221 and an interior bottom surface 228 at the second end portion 222, the liquid receiving cavity 225 having an interior diameter 226 and an interior circumferential surface 227, and the first end portion 221 of the carafe 220 defines threads 229 that engage with the threads 191 of the portafilter frame 180, the carafe 220 further defining gripping recesses 230 in the exterior circumferential surface 224 to promote gripping by a user for detachment from, and attachment to, the portafilter frame 180.

A further aspect of the present invention is to provide an apparatus for making espresso wherein the gearbox 20 provides a gear ratio between rotation of the hand crank 140 and axial movement of the lead screw 60 of approximately 1.6 mm/rev.

A further object of the present invention is to provide an apparatus for making espresso wherein the gearbox 20 provides a gear ratio between rotation of the hand crank 140 and axial movement of the lead screw 60 so as to generate pressure within the pressure cylinder 160 and below the plunger 70 of approximately 130 psi.

A still further object of the present invention is to provide an apparatus for infusing a liquid and further comprising: a tamper 250 that threadably releasably interconnects with the portafilter frame 180, the tamper 250 defining a medial axial chamber 255 and the tamper 250 carries a spring biased and axially adjustably positionable base 263 within the medial axial chamber 255, the base 263 having a diameter that is substantially the same as the diameter of the removable particulate basket 200; and engagement of the tamper 250 with the portafilter frame 180 causes the base 263 to exert compressive axial pressure on particulate within the removable particulate basket 200 medial particulate cavity 205.

An even still further object of the present invention is to provide a tamper 250 releasably interconnectable to the portafilter frame 180 to compress particulate therein, the tamper 250 comprising: a locking ring 252 having a first end portion 253, a second end portion 254 and defining a medial channel 255, the first end portion 253 having a first outer circumferential surface 256, defining first interior threads 258 and defining a first interior diameter 260, and the second end portion 254 having a second outer circumferential surface 257, defining second interior threads 259 and defining a second interior diameter 261 that is greater than the first interior diameter 260; a base 263 that is adjustably positionally carried within the medial channel 255 of the locking ring 252, the base 263 having a first end portion 264 and a second end portion 265 and defining a medial chamber 270 that has an interior bottom surface 271 with a medial cylinder 272 extending axially there from, the first end portion 264 of the base 263 having a first outer circumferential surface 266 and a first outer diameter 267, and the second end portion 265 of the base 263 has a second outer circumferential surface 268 and a second outer diameter 269, and the medial axially extending cylinder 272 defines a medial channel 272A that defines an interior diameter 273; a preload spring 277 having a predetermined compression strength carried on the medial cylinder 272 that extends axially from the interior bottom surface 271 of the medial chamber 270; a spring plate 278 that engages with both the preload spring 277 and a medial channel 272A defined by the medial cylinder 272, the spring plate 278 having a first end portion 279 and a second end portion 280, and a radially enlarged shoulder 283 on an outer circumferential surface 278A between the first end portion 279 and the second end portion 280, the second end portion 280 defining a diameter 281 that allows axial engagement with the medial channel 272A of the medial cylinder 272, and defining a threaded medial axial channel 282; a retention spring 285 having a predetermined compression strength carried on the spring plate 278 and communicating with the radially enlarged shoulder 283 opposite the base 263; a tamper grip 287 that engages with both the retention spring 285 and the spring plate 278 opposite the base 263, the tamper grip 287 having a first axial end portion 288 and a second end portion 289 defining an opening to a medial chamber 290 that is defined by an interior axial surface 291 and a threaded inner circumferential surface 298, the interior axial surface 291 defining a medial axial hole 292 having a countersunk shoulder 292A that has plural spacedly arrayed detents 293, the medial chamber 290 further defining a threaded cylinder 294 that extends axially from the interior axial surface 291, and toward the second end portion 289 the threaded cylinder 294 defining a diameter 296, exterior threads 295 and having alignment lugs 297 that engage with mating alignment notches 275 defined in the base 263; and a preload screw 299 that extends through the medial axial hole 292 of the tamper grip 287 and engages in the threaded medial axial channel 282 of the spring plate 278 and with the base 263, the preload screw 299 having a threaded shaft 300 with a terminal end 301, and a radially enlarged head 302 opposite the terminal end 301, the radially enlarged head 302 defining a tool engaging feature 303 on a surface opposite the threaded shaft 300, and the radially enlarged head 302 defines an alignment indicator 304 to cooperate with the plural spacedly arrayed detents 293 defined in the tamper grip 287 to provide predetermined information to a user.

Having described the structure and operation of our apparatus for infusing a liquid, as is required by the statute, we respectfully request issuance of Utility Letters Patent.

We claim:
1. An apparatus for infusing a liquid, the apparatus comprising:
   a body having a first end portion, and a second end portion and an outer circumferential surface;
   a gear box at the first end portion of the body, the gear box having a first end portion that defines a liquid receiving depression, a second end portion, and a liquid channel that communicates between the liquid receiving depression and the second end portion for liquid to pass there-through, the gear box further defining an axially aligned lead screw channel that carries an axially movable lead screw therein; and
   the lead screw has opposing first and second end portions, defines threads in an outer circumferential surface, and defines an axially aligned key-way that engages with a lead screw key carried by the gear box to prevent the lead screw from rotating axially relative to the gear box, and the lead screw threadably communicates with a lead screw nut that is carried in a lead screw nut cavity defined in the gear box; and
   the lead screw nut defines worm gear threads in an outer circumferential surface, and defines an axial channel, and threads defined in an inner circumferential surface of the lead screw nut axial channel operatively engage with the threads defined in the lead screw; and
   the lead screw nut cavity defined in the gear box communicates with a transversely extending worm gear channel defined in the gear box, so that the worm gear threads defined in the lead screw nut operatively engage with worm gear threads defined in a worm gear carried in the worm gear channel; and
   a hand crank is interconnected with the worm gear so that rotation of the hand crank is mechanically communicated to the lead screw to axially move the lead screw, without rotation, in a first direction, and in a second direction; and
   a valve body is carried at the second end portion of the lead screw, the valve body defining a pressure relief channel, and carrying a spider ring spring that movably interconnects the valve body to a plunger; and the plunger is generally annular in configuration and defines a medial axial channel, and the spider ring spring may bias the plunger in a direction away from engagement with the valve body so that a gap may be defined between the valve body and the plunger so that liquid may flow therebetween from a position in a pressure cylinder above the plunger to a position in the pressure cylinder vertically below the plunger when the plunger is in a first position, and when the plunger is in a second position, any biasing of the spider ring spring is over, responsive to axial downward movement of the valve body toward the second end portion of the body, and the gap is closed, and the valve body and the plunger are sealingly engaged with one another so that fluid cannot pass/flow therebetween; and the pressure cylinder is elongate, and cylindrical, and has a first end portion that is threadably interconnected with the second end portion of the gear box, and the pressure cylinder defines a medial channel that extends between the first end portion and a second end portion, the medial channel having an inner diameter that is substantially the same as a diameter of the plunger so that a fluid tight seal is maintained therebetween as the plunger moves axially within the pressure cylinder medial channel responsive to rotation of the hand crank and axial movement of the lead screw, the pressure cylinder further defining threads at a second end portion to provide a releasable interconnection with a portafilter frame; and the portafilter frame is threadably interconnected to the second end portion of the pressure cylinder, the portafilter frame defining a medial channel and carrying a removable particulate basket within the medial channel, the removable particulate basket defining a particulate cavity and a plurality of spacedly arrayed holes are defined within the particulate cavity for passage of infused liquid there-through, and into a carafe; and the carafe is releasably interconnected to the portafilter frame opposite the pressure cylinder and the carafe defines a fluid receiving cavity to collect the infused liquid passing through the removable particulate basket.

2. The apparatus for infusing a liquid of claim 1 and wherein the pressure cylinder has an inner wall and an outer wall with a thermally insulating void between the inner wall and the outer wall.

3. The apparatus for infusing a liquid of claim 1 and wherein the spider ring spring has a spider ring hub that defines a medial channel through which the second end portion of the lead screw extends;

a valve body engaging edge portion adjacent the spider ring hub; and plural spacedly arrayed spider ring arms that each extend generally radially outwardly from the spider ring hub, each of the plural spacedly arrayed spider ring arms having a first outer arm portion, and a second inner arm portion, and each first outer arm portion terminates at a terminal end portion that communicates with the plunger; and the spider ring spring movably interconnects the valve body and the plunger.

4. The apparatus for infusing a liquid of claim 1 and wherein the worm gear is barrel-like in configuration and has a first end portion, a second end portion, and a socket pinion extends axially from the second end portion; and the worm gear is carried within the transversely extending worm gear channel defined in the gear box.

5. The apparatus for infusing a liquid of claim 3 and wherein the plunger defines a diameter and has an outer circumferential edge, that defines a seal channel, that carries an O-ring therein; and an inwardly downwardly tapering depression defined in an upper surface of the plunger defines an annular fluid seal groove which carries a seal therein to provide a fluid tight seal between the plunger and a plunger engaging flange of the valve body; and the plunger defines plural spacedly arrayed spider arm latches in the outer circumferential edge, each of the spacedly arrayed spider arm latches configured to engage with the terminal end portions of the plural spacedly arrayed spider arms of the spider ring spring.

6. The apparatus for infusing a liquid of claim 1 and further comprising:

a flexible vented gasket between the carafe and the portafilter frame to allow escape of pressurized vapor.

7. The apparatus for infusing a liquid of claim 1 and wherein the carafe is cup-like in configuration and has a first end portion, a medial portion, a second end portion, an exterior circumferential surface and defines a liquid receiving cavity between the first end portion and an interior bottom surface at the second end portion, the liquid receiving cavity having an interior diameter and an interior circumferential surface, and the first end portion of the carafe defines threads that engage with threads defined in the portafilter frame, the carafe further defining gripping features in the exterior circumferential surface to promote gripping by a user for detachment from, and attachment to, the portafilter frame.

8. The apparatus for infusing a liquid of claim 1 and wherein the gear box has an outer circumferential surface, a first end portion that has an axially aligned upper surface that defines a concavely shaped liquid receiving depression; and a second end portion that has an axially aligned lower surface; and a radially reduced medial portion between the first end portion and the second end portion; and a liquid drain is defined within the liquid receiving depression, the liquid drain defining the liquid channel that communicates between the concavely shaped liquid receiving depression and the axially aligned lower surface for liquid to pass there-through; and the gear box further defining the axially aligned lead screw channel that extends between the upper and lower axially aligned surfaces and the lead screw channel carries the radially inwardly extending lead screw lug that slidably engages with the axially movable lead screw carried within the lead screw channel.

9. The apparatus for infusing a liquid of claim 1 and wherein the lead screw and the lead screw nut and the worm gear all rotate relative to one another responsive to rotation of the hand crank; and the lead screw nut cavity defined in the gear box communicates with a transversely extending worm gear channel defined in the gear box, so that the worm gear threads defined in the lead screw nut operatively engage with the worm gear threads defined in a worm gear carried in the transversely extending worm gear channel.

10. The apparatus for infusing a liquid of claim 1 and wherein the hand crank is positionally adjustable and extends proximate the outer circumferential surface of the body; and the hand crank has a socket that has a first end portion and a second end portion, and the first end portion is engaged with an axially extending socket pinion carried by the worm gear; and the second end portion socket defines a diametrically extending through hole to adjustably positionally engage with an elongate second arm of the hand crank; and the socket also defines an axially aligned hole in the second end portion for a threaded set screw to adjustably secure the elongate second arm to the socket; and the elongate second arm has a first end portion and a second end portion that defines plural spacedly arrayed bends, and the first end portion of the elongate second arm defines a first and a second diametrically extending through hole for the threaded set screw, and the first hole is aligned axially perpendicular relative to the second hole; and the second end portion of the elongate second arm carries a hand grip at a terminal end thereof;

and the elongate second arm is positionally adjustable relative to the socket by predetermined alignment of the first and second through holes, relative to the axially aligned hole defined in the socket and engagement of the threaded set screw therein; and rotation of the hand crank responsively axially rotates the worm gear, and the axial rotational motion of the worm gear is threadably communicated to the lead screw nut which responsively communicates the rotational motion to the lead screw, which responsively causes the lead screw to move axially, and without rotation, in a first direction, and in a second direction; and the rotation of the hand crank and the axial rotation of the worm gear is in a direction that is perpendicular to the axial movement of the lead screw.

11. The apparatus for infusing a liquid of claim 1 and wherein the valve body is carried at the second end portion of the lead screw, and the valve body has an outwardly downwardly tapered first end portion, a medial portion, an inwardly downwardly tapered second end portion; and a plunger engaging flange at the inwardly downwardly tapered second end portion; and a pressure relief channel defined in the valve body communicates between the inwardly downwardly tapered second end portion which defines a pressure relief entrance orifice and the medial portion of the valve body which defines a pressure relief exit orifice; and the pressure relief channel defines an interior surface at the pressure relief entrance; and a ball bearing seal is carried within the pressure relief channel, the ball bearing seal having a diameter that frictionally communicates with interior surfaces of the pressure relief entrance orifice to provide a fluid tight seal therebetween; and the ball bearing seal is positionally maintained in frictional communication with the interior surface by a biasing spring that has a predetermined compression strength of between approximately 145 psi and approximately 160 psi.

12. The apparatus for infusing a fluid of claim 1 and wherein the plunger is generally annular in configuration and has, a first upper surface proximate the valve body that defines and inwardly downwardly tapered depression, and a second lower surface opposite the valve body, and defines a medial axial channel that operatively communicates with the valve body, and the plunger has a diameter with an outer circumferential edge, the outer circumferential edge defining a seal channel, that carries an O-ring therein; and the inwardly downwardly tapering depression defines an annular fluid seal groove which carries a seal therein to provide a fluid tight seal between the plunger and the valve body, and the plunger defines plural spacedly arrayed spider arm latches in the outer circumferential edge, each of the spacedly arrayed spider arm latches configured to engage with terminal end portions of plural spacedly arrayed spider arms of the spider ring spring, and wherein an angle between the first outer arm and the second inner arm of the spider ring spring biases the plunger in a direction away from engagement with the valve body so that a gap is defined between the valve body and the inwardly tapered depression defined in the first upper surface of the plunger so that liquid may flow therebetween from a position in the pressure cylinder above the plunger to a position in the pressure cylinder vertically below the plunger.

13. The apparatus for infusing a liquid of claim 1 and wherein the pressure cylinder is formed of stainless steel, is elongate and cylindrical and has an inner wall and an outer wall with a thermally insulating void therebetween; and the outer wall has an outer circumferential surface; and the inner wall has an inner circumferential surface; and the pressure cylinder is threaded at a first end portion and is threaded at a second end portion; and the pressure cylinder first end portion is threadably interconnected with the second end portion of the gear box; and the pressure cylinder defines a medial channel that is defined by the inner circumferential surface of the inner wall and the medial channel extends between the first end portion and the second end portion; and the medial channel has an inner diameter that is substantially the same as the plunger diameter so that a fluid tight seal is maintained between the inner circumferential surface and the O-ring carried in a seal channel defined in the outer circumferential edge of the plunger, as the plunger moves axially within the medial channel of the pressure cylinder responsive to rotation of the hand crank and axial movement of the lead screw, the pressure cylinder further having an inner radially enlarged shoulder at the second end portion, within the medial channel, the radially enlarged portion defining threads on an inner circumferential surface thereof, and the radially enlarged shoulder defining a seal groove carrying a seal therein to provide a fluid tight threaded interconnection between the pressure cylinder and the portafilter frame.

14. The apparatus for infusing a liquid of claim 1 and wherein the portafilter frame is threadably interconnected to the second end portion of the pressure cylinder, the portafilter frame having a first end portion, a medial portion, and a second end portion and defines a medial channel that has a diameter, and an inner circumferential surface, the portafilter frame further has a radially reduced shoulder at the first end portion with threads defined in the radially reduced shoulder; and the portafilter frame has a radially reduced shoulder at the second end portion that defines threads; and the portafilter frame carries a removable particulate basket within the medial channel, the removable particulate basket having an upper end portion with a radially enlarged securement lip that carries a fluid seal thereon; and the removable particulate basket defines a medial particulate cavity and a plurality of spacedly arrayed holes are defined within the removable particulate basket for passage of infused liquid there-through and into a carafe.

15. The apparatus for infusing a liquid of claim 1 and wherein the carafe is releasably interconnected to the radially reduced shoulder at the second end portion of the portafilter frame and the carafe collects the infused fluid passing through the removable particulate basket; and a flexible vented gasket is carried between the carafe and the portafilter frame to allow escape of pressurized vapor; and the fluid carafe is cup-like in configuration and has a first end portion, a medial portion, a second end portion, an exterior circumferential surface and defines a liquid receiving cavity between the first end portion and an interior bottom surface at the second end portion the liquid receiving cavity having an interior diameter and an interior circumferential surface, and the first end portion of the carafe defines threads that engage with the threads of the portafilter frame, the carafe further defining gripping features in the exterior circumferential surface to promote gripping by a user for detachment from, and attachment to, the portafilter frame.

16. The apparatus for infusing a liquid of claim 1 and wherein the gearbox provides a gear ratio between rotation of the hand crank and axial movement of the lead screw of approximately 1 revolution to 1.6 mm of movement.

17. The apparatus for infusing a liquid of claim 1 and wherein the gearbox provides a gear ratio between rotation of the hand crank and axial movement of the lead screw so as to generate pressure within the pressure cylinder and below the plunger of approximately 130 psi.

18. The apparatus for infusing a liquid of claim 1 and further comprising:

a tamper for compressing infusible particulate contained within the particulate basket, the tamper having,
  a tamper collar that defines a medial channel and which is releasably interconnectable to the porta filter frame,
  a tamper base that is adjustably movably carried within the tamper collar medial channel,
  a tamper grip that communicates with the tamper collar, and
  a spring between an interior surface of the tamper grip and the tamper base.

19. An apparatus for making espresso, the apparatus comprising:

a body having a first end portion, a medial portion, and a second end portion, the body having a diameter and an outer circumferential surface that defines gripping features;

a gear box at the first end portion of the body, the gear box having an outer circumferential surface, a first end portion that has an axially aligned upper surface that defines a concavely shaped liquid receiving depression, and a second end portion that has an axially aligned lower surface, and a radially reduced medial portion between the first end portion and the second end portion, and a liquid drain is defined within the liquid receiving depression, the liquid drain defining a liquid channel that communicates between the concavely shaped liquid receiving depression and the axially aligned lower surface for liquid to pass there-through, the gear box further defining an axially aligned lead screw channel that extends between the upper and lower axially aligned surfaces, the lead screw channel having a radially inwardly extending lead screw lug that slidably engages with an axially movable lead screw that is carried within the lead screw channel; and the lead screw is elongate and has a first end portion and a second end portion, defines threads in an outer circumferential surface, and defines an axially aligned anti-rotation key-way that extends between the first end portion and the second end portion, the key-way slidably engages with the lead screw key to prevent the lead screw from rotating axially, and the lead screw is carried within and extends axially though the lead screw channel and extends axially outwardly from both the first end portion and the second end portion of the gear box, and the lead screw threadably communicates with a lead screw nut that is rotatably carried on rotation bushings in a lead screw nut cavity defined in the gear box; and the lead screw nut defines a medial axial channel through which the lead screw axially extends, and threads defined in an inner circumferential surface of a medial axial channel operatively engage with the threads defined in the outer circumferential surface of the lead screw so that the lead screw and the lead screw nut move relative to one another responsive to axial rotation of the lead screw nut, and the lead screw nut further defines worm gear threads in an outer circumferential surface, and the lead screw nut cavity communicates with a transversely extending worm gear channel, so that the worm gear threads defined in the lead screw nut operatively engage with threads defined in a worm gear carried in the transversely extending worm gear channel defined in the gear box; and the worm gear is barrel shaped in configuration and has a first end portion and a second end portion and a socket pinion extends axially from the second end portion and the worm gear defines worm gear threads in an outer circumferential surface that operatively threadably communicate with the worm gear threads defined in the lead screw nut so that rotational motion is threadably communicated therebetween;

a positionally adjustable hand crank that extends proximate the outer circumferential surface of the body, is interconnected with the axially extending socket pinion, the hand crank having a socket that has a first end portion and a second end portion, and the first end portion is engaged with the axially extending socket pinion, and the second end portion defines a diametrically extending through hole to adjustably positionally engage with an elongate second arm, and an axially aligned hole for a threaded set screw, the elongate second arm has a first end portion and a second end portion that defines plural spacedly arrayed bends, and the first end portion defines a first and a second diametrically extending through hole for the threaded set screw, and the first hole is aligned axially perpendicular relative to the second hole, and the second end portion of the elongate second arm carries a hand grip at a terminal end thereof, and the elongate second arm is positionally adjustable relative to the socket by predetermined alignment of the first and second through holes relative to the axially aligned hole of the socket and engagement of the threaded set screw therein so that rotation of the hand crank responsively axially rotates the worm gear, and the axial rotational motion of the worm gear is threadably communicated to the lead screw nut which responsively communicates the rotational motion to the lead screw which responsively causes the lead screw to move axially, and without rotation, in a first direction, and in a second direction, responsive to the rotation of the hand crank, and the rotation of the hand crank and axial rotation of the worm gear is in a direction that is perpendicular to the axial movement of the lead screw; and the lead screw carries, at its second end portion, a valve body, the valve body having an outwardly downwardly tapered first end portion, a medial portion, an inwardly downwardly tapered second end portion with a plunger engaging flange at the second end portion, a pressure relief channel defined in the valve body communicates between the second end portion which defines a pressure relief entrance orifice and the medial portion which defines a pressure relief exit orifice, the pressure relief channel defines an interior surface at the pressure relief entrance, and a ball bearing seal is carried within the pressure relief channel, the ball bearing seal having a diameter that frictionally communicates with interior surfaces of the pressure relief entrance orifice to provide a fluid tight seal therebetween, and the ball bearing seal is positionally maintained in frictional communication with the interior surface by a biasing spring that has a predetermined compression strength of approximately between approximately 145 psi and approximately 160 psi, and the valve body, at the first end portion, carries a spider ring spring; and the spider ring spring has a spider ring hub that defines a medial channel through which the second end portion of the lead screw extends, the spider ring spring further having a valve body engaging edge portion and plural spacedly arrayed spider ring arms, each of the plural spacedly arrayed spider ring arms having a second inner arm portion, and a first outer arm portion, and each first outer arm portion terminates at an end portion that communicates with a plunger, and the spider ring spring movably interconnects the valve body and the plunger; and the plunger is generally annular in configuration and has a first upper surface proximate the valve body that defines and inwardly downwardly tapered depression, and has a second lower surface opposite the valve body, and the plunger defines a medial axial channel that operatively communicates with the second end portion of the valve body, and the plunger has a diameter with an outer circumferential edge, the outer circumferential edge defining a seal channel, that carries an O-ring therein, the inwardly downwardly tapering depression of the plunger defines an annular fluid seal groove which carries a seal therein to provide a fluid tight seal between the plunger and the plunger engaging flange of the valve body, and the plunger defines plural spacedly arrayed spider arm latches in the outer circumferential edge, each of the spacedly arrayed spider arm latches configured to engage with terminal end portions of the plural spacedly arrayed spider arms of the spider ring spring, and wherein an angle between the first outer arm and the second inner arm of the spider ring spring biases the plunger in a direction away from engagement with the valve body so that a gap is defined between the valve body and the inwardly tapered depression defined in the first upper surface of the plunger so that liquid may flow therebetween from a position in a pressure cylinder above the plunger to a position in the pressure cylinder vertically below the plunger when the plunger is in a first position, and when the plunger is in a second position any biasing of the spider ring spring is over, responsive to axial downward movement of the valve body toward the second end portion of the body, and the gap is closed, and the valve body is sealingly engaged with the plunger so that fluid/liquid cannot pass/flow therebetween; and the pressure cylinder is preferably formed of stainless steel, is elongate and cylindrical and has an inner wall and an outer wall with a thermally insulating void therebetween, the outer wall has an outer circumferential surface, and the inner wall has an inner circumferential surface, the pressure cylinder is externally threaded at the first end portion and is internally threaded at the second end portion, the pressure cylinder first end portion is threadably interconnected with the second lower end portion of the gear box, and the pressure cylinder defines a medial channel that is defined by the inner circumferential surface of the inner wall and the medial channel extends between the first end portion and the second end portion, the medial channel having an inner diameter that is substantially the same as the plunger diameter so that a fluid tight seal is maintained between the inner circumferential surface and the O-ring carried in the O-ring channel defined in the outer circumferential edge of the plunger, as the plunger moves axially within the medial channel of the pressure cylinder responsive to rotation of the hand crank and axial movement of the lead screw, the pressure cylinder further having a radially reduced shoulder at the first end portion with the threads defined in the radially reduced shoulder, and having a radially enlarged shoulder at the second end portion, the radially enlarged portion defining threads on an inner circumferential surface thereof, and the radially enlarged shoulder defining a seal groove carrying a seal therein to provide a fluid tight threaded interconnection between the pressure cylinder and a portafilter frame; and the portafilter frame is threadably interconnected to the second end portion of the pressure cylinder, the portafilter frame having a first end portion, a medial portion, and a second end portion and defines a medial channel that has a diameter, and has an exterior circumferential surface and an opposing interior circumferential surface, the portafilter frame further has a radially reduced shoulder at the first end portion with threads defined in the radially reduced shoulder, and the portafilter frame has a radially reduced shoulder at the second end portion that defines threads, the portafilter frame carries a removable particulate basket within the medial channel, the removable particulate basket having an upper end portion with a radially enlarged securement lip that carries a fluid seal thereon, the removable particulate basket defining a medial particulate cavity and a plurality of spacedly arrayed holes are defined within the removable particulate cavity for passage of infused liquid there-through and into a carafe; and the carafe is threadably interconnected to the radially reduced shoulder at the second end portion of the portafilter frame and the carafe collects the infused fluid passing through the removable particulate basket, a flexible vented gasket is carried between the carafe and the portafilter frame to allow escape of pressurized vapor, the fluid carafe is cup-like in configuration and has a first end portion, a medial portion, a second end portion, an exterior circumferential surface and defines a liquid receiving cavity between the first end portion and an interior bottom surface at the second end portion, the liquid receiving cavity having an interior diameter and an interior circumferential surface, and the first end portion of the carafe defines threads that engage with the threads of the portafilter frame, the carafe further defining gripping recesses in the exterior circumferential surface to promote gripping by a user for detachment from, and attachment to, the portafilter frame.

20. The apparatus for making espresso of claim 19 and wherein the gearbox provides a gear ratio between rotation of the hand crank and axial movement of the lead screw of approximately 1 revolution to 1.6 mm of movement.

21. The apparatus for making espresso of claim 19 and wherein the gearbox provides a gear ratio between rotation of the hand crank and axial movement of the lead screw so as to generate pressure within the pressure cylinder and below the plunger of approximately 130 psi.

22. The apparatus for making espresso of claim 19 and further comprising:
   a tamper for compressing espresso in the particulate basket, the tamper having,
      a tamper collar that defines a medial channel and which is releasably interconnectable to the porta filter frame,
      a tamper base that is adjustably movably carried within the tamper collar medial channel,
      a tamper grip that communicates with the tamper collar, and
      a spring between an interior surface of the tamper grip and the tamper base.

23. The apparatus for infusing a liquid as claimed in claim 1 and further comprising:
   a tamper that releasably interconnects with the portafilter frame, the tamper defining a medial axial chamber and the tamper carries a spring biased and axially adjustably positionable, tamper base within the medial axial chamber, the tamper base having a diameter that is substantially the same as the diameter of the particulate basket; and
   engagement of the tamper with the portafilter frame causes the tamper base to exert compressive axial pressure on particulate within the particulate basket medial particulate cavity.

24. The apparatus for making espresso as claimed in claim 19 and further comprising:
   a tamper that releasably interconnects with the portafilter frame, the tamper defining a medial axial chamber and the tamper carries a spring biased and axially adjustably positionable, tamper base within the medial axial chamber, the tamper base having a diameter that is substantially the same as the diameter of the particulate basket; and
   engagement of the tamper with the portafilter frame causes the tamper base to exert compressive axial pressure on particulate within the particulate basket medial particulate cavity.

\* \* \* \* \*